(12) United States Patent
Ales et al.

(10) Patent No.: US 9,754,688 B2
(45) Date of Patent: *Sep. 5, 2017

(54) SUSPENDED UPPER INTERNALS FOR COMPACT NUCLEAR REACTOR INCLUDING A LOWER HANGER PLATE

(71) Applicant: Babcock & Wilcox mPower, Inc., Charlotte, NC (US)

(72) Inventors: Matthew W Ales, Forest, VA (US); Scott Shargots, Forest, VA (US)

(73) Assignee: BWX Technologies, Inc., Charlotte, NC (US)

( * ) Notice: Subject to any disclaimer, the term of this patent is extended or adjusted under 35 U.S.C. 154(b) by 755 days.

This patent is subject to a terminal disclaimer.

(21) Appl. No.: 13/861,480

(22) Filed: Apr. 12, 2013

(65) Prior Publication Data

US 2013/0301784 A1    Nov. 14, 2013

Related U.S. Application Data

(60) Provisional application No. 61/625,261, filed on Apr. 17, 2012, provisional application No. 61/625,764, filed on Apr. 18, 2012.

(51) Int. Cl.
*G21C 13/02* (2006.01)
*G21C 7/12* (2006.01)
*G21C 1/32* (2006.01)

(52) U.S. Cl.
CPC ............... *G21C 13/02* (2013.01); *G21C 7/12* (2013.01); *G21C 1/32* (2013.01); *Y02E 30/39* (2013.01)

(58) Field of Classification Search
CPC . G21C 1/08; G21C 1/086; G21C 1/32; G21C 1/322

(Continued)

(56) References Cited

U.S. PATENT DOCUMENTS 3,015,616 A    1/1962   Stuartz et al.
3,212,978 A   10/1965   Short et al.
(Continued)

FOREIGN PATENT DOCUMENTS

CN    1515011 A     7/2004
JP    62-044686 A   2/1987
(Continued)

OTHER PUBLICATIONS

International Search Report and Written Opinion for PCT/US2013/036406 dated Sep. 30, 2013.

*Primary Examiner* — Jack W Keith
*Assistant Examiner* — Sharon M Davis
(74) *Attorney, Agent, or Firm* — Nelson Mullins Riley & Scarborough, LLP

(57) ABSTRACT

A pressure vessel comprises an upper vessel section and a lower vessel section. A nuclear reactor core comprises fissile material contained in a containing structure and disposed in the lower vessel section. Upper internals are disposed in the lower vessel section above the nuclear reactor core. The upper internals include at least guide frames and internal control rod drive mechanisms (CRDMs) with CRDM motors mounted on a suspended support assembly including a plurality of hanger plates connected by tie rods. The plurality of hanger plates includes a lowermost hanger plate having alignment features configured to align the upper internals with the containing structure that contains the nuclear reactor core.

15 Claims, 15 Drawing Sheets

(58) Field of Classification Search
USPC .................................. 376/353, 406, 461
See application file for complete search history.

(56) References Cited

U.S. PATENT DOCUMENTS

| | | | |
|---|---|---|---|
| 3,379,619 A | 4/1968 | Andrews et al. | |
| 3,527,670 A | 9/1970 | Winders | |
| 3,607,629 A | 9/1971 | Frisch et al. | |
| 3,650,895 A | 3/1972 | Sodergard | |
| 3,734,825 A | 5/1973 | Schabert et al. | |
| 3,853,699 A | 12/1974 | Frisch et al. | |
| 3,853,702 A | 12/1974 | Bevilacqua et al. | |
| 3,857,599 A | 12/1974 | Jones et al. | |
| 3,940,311 A * | 2/1976 | Frisch | G21C 7/12 376/224 |
| 3,959,072 A | 5/1976 | Dupen | |
| 4,057,467 A | 11/1977 | Kostrzewa | |
| 4,072,563 A | 2/1978 | McDonald et al. | |
| 4,124,442 A | 11/1978 | Zhuchkov et al. | |
| 4,175,004 A | 11/1979 | Jabsen | |
| 4,187,145 A | 2/1980 | Noyes et al. | |
| 4,219,386 A | 8/1980 | Osborne et al. | |
| 4,231,843 A | 11/1980 | Myron et al. | |
| 4,235,674 A | 11/1980 | Yue | |
| 4,252,613 A | 2/1981 | Jabsen | |
| 4,313,797 A | 2/1982 | Attix | |
| 4,420,456 A | 12/1983 | Nickel et al. | |
| 4,472,348 A | 9/1984 | Desfontaines | |
| 4,484,093 A | 11/1984 | Smith | |
| 4,562,038 A | 12/1985 | Assedo et al. | |
| 4,569,705 A | 2/1986 | Allan | |
| 4,598,738 A | 7/1986 | Weber et al. | |
| 4,618,471 A | 10/1986 | Defaucheux et al. | |
| 4,640,811 A | 2/1987 | Peletan | |
| 4,663,576 A | 5/1987 | Scarola et al. | |
| 4,678,623 A | 7/1987 | Malandra et al. | |
| 4,681,728 A | 7/1987 | Veronesi et al. | |
| 4,683,106 A | 7/1987 | Jahnke | |
| 4,687,628 A | 8/1987 | Gillett et al. | |
| 4,759,904 A | 7/1988 | Gillett et al. | |
| 4,762,669 A | 8/1988 | Doshi | |
| 4,844,859 A * | 7/1989 | Coussau | F16B 21/10 285/140.1 |
| 4,857,264 A | 8/1989 | Veronesi et al. | |
| 4,857,265 A | 8/1989 | Pol et al. | |
| 4,863,678 A | 9/1989 | Shockling et al. | |
| 4,876,061 A | 10/1989 | Ekeroth et al. | |
| 4,885,127 A | 12/1989 | Yokoyama | |
| 4,888,151 A | 12/1989 | Gjertsen et al. | |
| 4,895,698 A | 1/1990 | DeMario | |
| 4,902,468 A | 2/1990 | Veronesi et al. | |
| 4,923,669 A | 5/1990 | DeMario | |
| 4,957,697 A | 9/1990 | Wada | |
| 4,963,318 A | 10/1990 | Johansson et al. | |
| 4,966,745 A | 10/1990 | Widener et al. | |
| 4,975,239 A | 12/1990 | O'Neil et al. | |
| 4,983,351 A | 1/1991 | Tower et al. | |
| 4,986,954 A | 1/1991 | Feurgard | |
| 4,990,304 A | 2/1991 | Rylatt | |
| 4,993,864 A | 2/1991 | Gjertsen et al. | |
| 4,994,233 A | 2/1991 | Freeman | |
| 4,996,018 A | 2/1991 | Bhatt et al. | |
| 5,006,305 A | 4/1991 | Denizou | |
| 5,009,837 A | 4/1991 | Nguyen et al. | |
| 5,024,806 A | 6/1991 | Cioffi et al. | |
| 5,024,808 A | 6/1991 | Land et al. | |
| 5,030,413 A | 7/1991 | Knierriem et al. | |
| 5,043,134 A | 8/1991 | Widener et al. | |
| 5,064,607 A | 11/1991 | Miller et al. | |
| 5,068,083 A | 11/1991 | John, Jr. et al. | |
| 5,141,711 A | 8/1992 | Gjertsen et al. | |
| 5,158,740 A | 10/1992 | Boatwright | |
| 5,183,628 A | 2/1993 | Baujat et al. | |
| 5,200,138 A | 4/1993 | Ferrari | |
| 5,207,978 A | 5/1993 | Barbe | |
| 5,207,980 A | 5/1993 | Gilmore et al. | |
| 5,227,125 A | 7/1993 | Beneck et al. | |
| 5,237,595 A | 8/1993 | Woodcock | |
| 5,241,570 A | 8/1993 | Challberg | |
| 5,265,137 A | 11/1993 | Busch | |
| 5,268,948 A | 12/1993 | Church et al. | |
| 5,276,719 A | 1/1994 | Batheja et al. | |
| 5,282,231 A | 1/1994 | Adams | |
| 5,282,233 A | 1/1994 | Bryan | |
| 5,299,246 A | 3/1994 | Bryan | |
| 5,328,667 A | 7/1994 | Johnson | |
| 5,361,279 A | 11/1994 | Kobsa et al. | |
| 5,367,549 A | 11/1994 | Hatfield | |
| 5,386,440 A | 1/1995 | Kashiwai et al. | |
| 5,436,945 A | 7/1995 | Weisel et al. | |
| 5,513,234 A | 4/1996 | Rottenberg | |
| 5,606,582 A | 2/1997 | Bergamaschi | |
| 5,625,657 A | 4/1997 | Gallacher | |
| 5,640,434 A | 6/1997 | Rottenberg | |
| 5,715,288 A | 2/1998 | Matteson | |
| 5,841,824 A | 11/1998 | Graham | |
| 5,844,958 A | 12/1998 | Leroux et al. | |
| 5,930,321 A | 7/1999 | Harkness et al. | |
| 6,055,288 A | 4/2000 | Schwirian | |
| 6,088,420 A | 7/2000 | Yokoyama et al. | |
| 6,091,790 A | 7/2000 | Ridolfo | |
| 6,097,779 A | 8/2000 | Challberg et al. | |
| 6,130,927 A | 10/2000 | Kang et al. | |
| 6,167,104 A | 12/2000 | Garzarolli et al. | |
| 6,236,699 B1 | 5/2001 | Ridolfo | |
| 6,275,557 B2 | 8/2001 | Nylund et al. | |
| 6,421,405 B1 | 7/2002 | Ridolfo | |
| 6,477,219 B2 | 11/2002 | Hirukawa et al. | |
| 6,489,623 B1 | 12/2002 | Peters et al. | |
| 6,636,578 B1 | 10/2003 | Clark | |
| 6,636,580 B2 | 10/2003 | Murakami et al. | |
| 6,810,099 B2 | 10/2004 | Nakamaru et al. | |
| 6,819,733 B2 | 11/2004 | Broders et al. | |
| 6,865,242 B2 | 3/2005 | Barbe et al. | |
| 6,895,067 B2 | 5/2005 | Borum et al. | |
| 7,085,340 B2 | 8/2006 | Goldenfield et al. | |
| 7,257,185 B1 | 8/2007 | Yamada et al. | |
| 7,280,946 B2 | 10/2007 | Russell, II et al. | |
| 7,289,590 B2 | 10/2007 | Joly et al. | |
| 7,412,021 B2 | 8/2008 | Fetterman et al. | |
| 7,424,412 B2 | 9/2008 | Kropaczek et al. | |
| 7,428,479 B2 | 9/2008 | Boer et al. | |
| 7,453,972 B2 | 11/2008 | Hellandbrand, Jr. et al. | |
| 7,526,058 B2 | 4/2009 | Fawcett et al. | |
| 7,548,602 B2 | 6/2009 | Smith, III et al. | |
| 7,561,654 B2 | 7/2009 | Makovicka et al. | |
| 7,574,337 B2 | 8/2009 | Kropaczek et al. | |
| 7,668,280 B2 | 2/2010 | Hellandbrand, Jr. et al. | |
| 7,668,284 B2 | 2/2010 | Sparrow et al. | |
| 7,672,418 B2 | 3/2010 | Aktas et al. | |
| 8,102,961 B2 | 1/2012 | Aktas et al. | |
| 2003/0123600 A1 | 7/2003 | Hesketh et al. | |
| 2003/0169839 A1 | 9/2003 | Matteson | |
| 2005/0069080 A1 | 3/2005 | Goldenfield et al. | |
| 2006/0153327 A1 | 7/2006 | Jiang | |
| 2006/0207672 A1 | 9/2006 | Henriksson et al. | |
| 2006/0222140 A1 | 10/2006 | Aleshin et al. | |
| 2006/0251205 A1 | 11/2006 | Balog | |
| 2007/0133732 A1 | 6/2007 | Nakayama et al. | |
| 2007/0206717 A1 | 9/2007 | Conner et al. | |
| 2008/0084957 A1 | 4/2008 | Aleshin et al. | |
| 2008/0145174 A1 | 6/2008 | Suzuki et al. | |
| 2008/0253496 A1 | 10/2008 | McCarty et al. | |
| 2008/0253497 A1 * | 10/2008 | Singleton | G21C 13/02 376/353 |
| 2009/0032178 A1 | 2/2009 | Feinroth | |
| 2009/0060114 A1 | 3/2009 | Defilippis | |
| 2009/0122946 A1 | 5/2009 | Fawcett et al. | |
| 2010/0150294 A1 | 6/2010 | Weisel et al. | |
| 2010/0316177 A1 | 12/2010 | Stambaugh et al. | |
| 2010/0316181 A1 * | 12/2010 | Thome | F22B 1/023 376/372 |
| 2011/0222640 A1 | 9/2011 | Desantis | |
| 2012/0014493 A1 | 1/2012 | Frank et al. | |

(56) References Cited

U.S. PATENT DOCUMENTS

2012/0051482 A1 3/2012 Shargots et al.
2012/0069947 A1 3/2012 Ketcham et al.
2012/0076254 A1 3/2012 Malloy et al.
2012/0099691 A1 4/2012 Shargots et al.

FOREIGN PATENT DOCUMENTS

| JP | 01-147396 A | 6/1989 |
| TW | 255969 B | 9/1995 |
| TW | 200845042 A | 11/2008 |

* cited by examiner

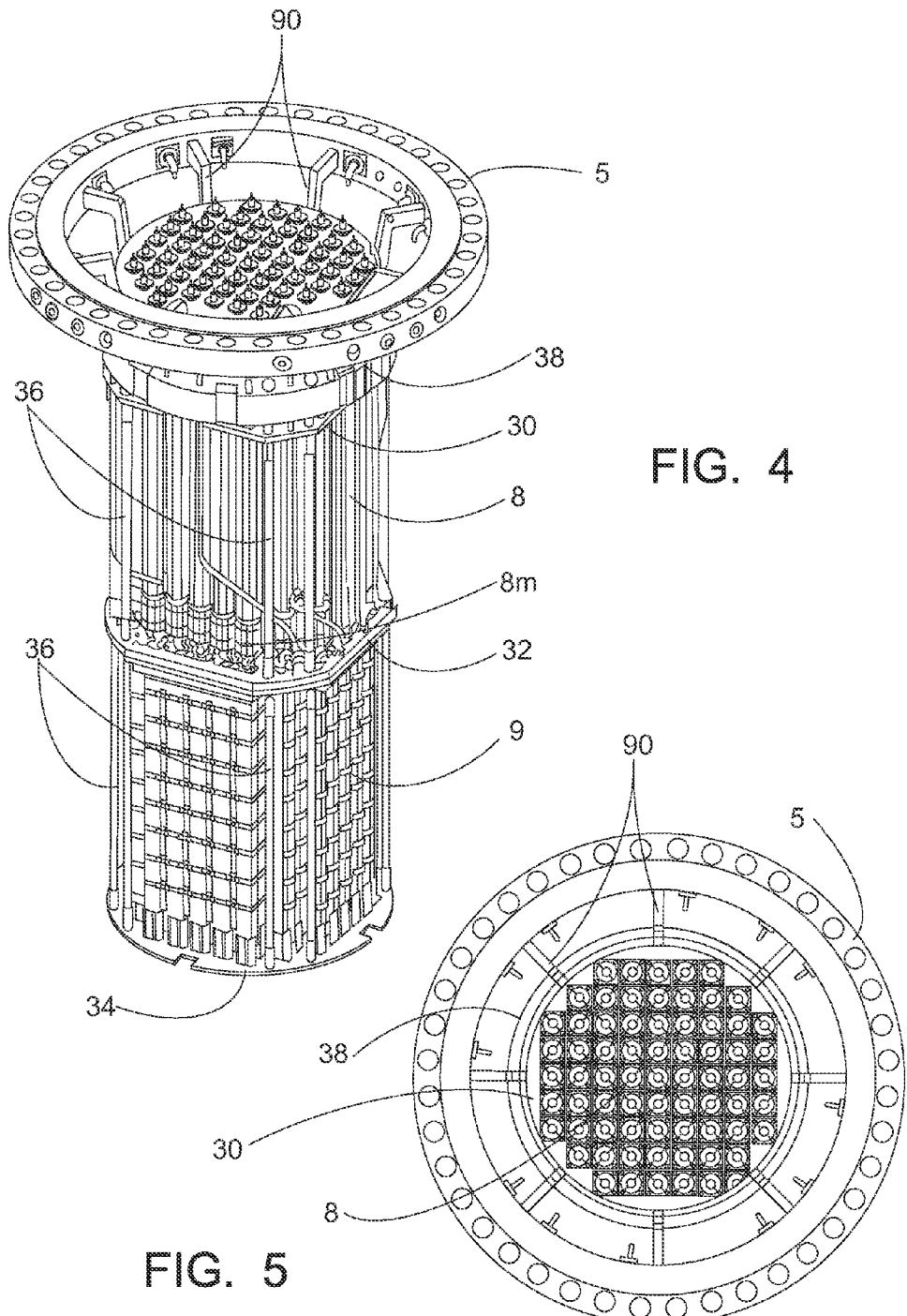

SUSPENDED UPPER INTERNALS FOR COMPACT NUCLEAR REACTOR INCLUDING A LOWER HANGER PLATE

This application claims the benefit of U.S. Provisional Application No. 61/625,764 filed Apr. 18, 2012 and titled "UPPER INTERNALS". U.S. Provisional Application No. 61/625,764 filed Apr. 18, 2012 titled "UPPER INTERNALS" is hereby incorporated by reference in its entirety into the specification of this application.

This application claims the benefit of U.S. Provisional Application No. 61/625,261 filed Apr. 17, 2012 and titled "LOWER HANGER PLATE". U.S. Provisional Application No. 61/625,261 filed Apr. 17, 2012 titled "LOWER HANGER PLATE" is hereby incorporated by reference in its entirety into the specification of this application.

BACKGROUND

The following relates to the nuclear reactor arts and related arts.

There is increasing interest in compact reactor designs. Benefits include: reduced likelihood and severity of abnormal events such as loss of a coolant accident (LOCA) event (both due to a reduction in vessel penetrations and the use of a smaller containment structure commensurate with the size of the compact reactor); a smaller and more readily secured nuclear reactor island (see Noel, "Nuclear Power Facility", U.S. Pub. No. 2010/0207261 A1 published Aug. 16, 2012 which is incorporated herein by reference in its entirety); increased ability to employ nuclear power to supply smaller power grids, e.g. using a 300 MWe or smaller compact reactor, sometimes referred to as a small modular reactor (SMR); scalability as one or more SMR units can be deployed depending upon the requisite power level; and so forth.

Some compact reactor designs are disclosed, for example, in Thome et al., "Integral Helical-Coil Pressurized Water Nuclear Reactor", U.S. Pub. No. 2010/0316181 A1 published Dec. 16, 2010 which is incorporated by reference in its entirety; Malloy et al., "Compact Nuclear Reactor", U.S. Pub. No. 2012/0076254 A1 published Mar. 29, 2012 which is incorporated by reference in its entirety. These compact reactors are of the pressurized water reactor (PWR) type in which a nuclear reactor core is immersed in primary coolant water at or near the bottom of a pressure vessel, and the primary coolant is suitably light water maintained in a subcooled liquid phase in a cylindrical pressure vessel that is mounted generally upright (that is, with its cylinder axis oriented vertically). A hollow cylindrical central riser is disposed concentrically inside the pressure vessel and (together with the core basket or shroud) defines a primary coolant circuit in which coolant flows upward through the reactor core and central riser, discharges from the top of the central riser, and reverses direction to flow downward back to below the reactor core through a downcomer annulus defined between the pressure vessel and the central riser. The nuclear core is built up from multiple fuel assemblies each comprising a bundle of fuel rods containing fissile material (typically $^{235}$U). The compact reactors disclosed in Thome et al. and Malloy et al. are integral PWR designs in which the steam generator(s) is disposed inside the pressure vessel, namely in the downcomer annulus in these designs. Integral PWR designs eliminate the external primary coolant loop carrying radioactive primary coolant. The designs disclosed in Thome et al. and Malloy et al. employ internal reactor coolant pumps (RCPs), but use of external RCPs (e.g. with a dry stator and wet rotor/impeller assembly, or with a dry stator and dry rotor coupled with a rotor via a suitable mechanical vessel penetration) is also contemplated (as is a natural circulation variant that does not employ RCPs). The designs disclosed in Thome et al. and Malloy et al. further employ internal pressurizers in which a steam bubble at the top of the pressure vessel is buffered from the remainder of the pressure vessel by a baffle plate or the like, and heaters, spargers, or so forth enable adjustment of the temperature (and hence pressure) of the steam bubble. The internal pressurizer avoids large diameter piping that would otherwise connect with an external pressurizer.

In a typical PWR design, upper internals located above the reactor core include control rod assemblies with neutron-absorbing control rods that are inserted into/raised out of the reactor core by control rod drive mechanisms (CRDMs). These upper internals include control rod assemblies (CRAs) comprising neutron-absorbing control rods yoked together by a spider. Conventionally, the CRDMs employ motors mounted on tubular pressure boundary extensions extending above the pressure vessel, which are connected with the CRAs via suitable connecting rods. In this design, the complex motor stator can be outside the pressure boundary and magnetically coupled with the motor rotor disposed inside the tubular pressure boundary extension. The upper internals also include guide frames constructed as plates held together by tie rods, with passages sized to cam against and guide the translating CRA's.

For compact reactor designs, it is contemplated to replace the external CRDM motors with wholly internal CRDM motors. See Stambaugh et al., "Control Rod Drive Mechanism for Nuclear Reactor", U.S. Pub. No. 2010/0316177 A1 published Dec. 16, 2010 which is incorporated herein by reference in its entirety; and DeSantis, "Control Rod Drive Mechanism for Nuclear Reactor", U.S. Pub. No. 2011/0222640 A1 published Sep. 15, 2011 which is incorporated herein by reference in its entirety. Advantageously, only electrical vessel penetrations are needed to power the internal CRDM motors. In some embodiments, the scram latch is hydraulically driven, so that the internal CRDM also requires hydraulic vessel penetrations, but these are of small diameter and carry primary coolant water as the hydraulic working fluid.

The use of internal CRDM motors shortens the connecting rods, which reduces the overall weight, which in turn reduces the gravitational impetus for scram. To counteract this effect, some designs employ a yoke that is weighted as compared with a conventional spider, and/or may employ a weighted connecting rod. See Shargots et al., "Terminal Elements for Coupling Connecting Rods and Control Rod Assemblies for a Nuclear Reactor", U.S. Pub. No. 2012/0051482 A1 published Mar. 1, 2012 which is incorporated herein by reference in its entirety. Another design improvement is to replace the conventional guide frames which employ spaced apart guide plates held together by tie rods with a continuous columnar guide frame that provides continuous guidance to the translating CRA's. See Shargots et al, "Support Structure for a Control Rod Assembly of a Nuclear Reactor", U.S. Pub. No. 2012/0099691 A1 published Apr. 26, 2012 which is incorporated herein by reference in its entirety.

The use of internal CRDMs and/or continuous guide frames and/or internal RCPs introduces substantial volume, weight, and complexity to the upper internals. These internals are "upper" internals in that they are located above the reactor core, and they must be removed prior to reactor refueling in order to provide access to the reactor core. In principle, some components (especially the internal RCPs) can be located below the reactor core, but this would introduce vessel penetrations below the reactor core which is undesirable since a LOCA at such low vessel penetrations can drain the primary coolant to a level below the top of the reactor core, thus exposing the fuel rods. Another option is to employ external RCPs, but this still leaves the complex internal CRDMs and guide frames.

Disclosed herein are improvements that provide various benefits that will become apparent to the skilled artisan upon reading the following.

BRIEF SUMMARY

In one disclosed aspect, an apparatus comprises: a pressure vessel comprising an upper vessel section and a lower vessel section; a nuclear reactor core comprising fissile material contained in a containing structure and disposed in the lower vessel section; and upper internals disposed in the lower vessel section above the nuclear reactor core. The upper internals include at least guide frames and internal control rod drive mechanisms (CRDMs) with CRDM motors mounted on a suspended support assembly including a plurality of hanger plates connected by tie rods. The plurality of hanger plates includes a lowermost hanger plate having alignment features configured to align the upper internals with the containing structure that contains the nuclear reactor core.

In another disclosed aspect, a method is performed in conjunction with a nuclear reactor including a pressure vessel with upper and lower vessel sections, a nuclear reactor core comprising fissile material contained in a containing structure and disposed the lower vessel section, and upper internals disposed in the lower vessel section that include at least guide frames and internal control rod drive mechanisms (CRDMs) with CRDM motors mounted on a suspended support assembly including a plurality of hanger plates connected by tie rods. The method comprises inserting the upper internals into the lower vessel section and, during the inserting, aligning the upper internals with the nuclear reactor core by engaging alignment features of a lowermost hanger plate of the suspended support assembly with the containing structure that contains the nuclear reactor core.

In another disclosed aspect, an apparatus comprises: a pressure vessel comprising an upper vessel section and a lower vessel section; a nuclear reactor core comprising fissile material contained in a containing structure and disposed the lower vessel section; and upper internals disposed in the lower vessel section, the upper internals including at least guide frames and internal control rod drive mechanisms (CRDMs) with CRDM motors mounted on a suspended support assembly including a plurality of hanger plates connected by tie rods, the plurality of hanger plates including a lowermost hanger plate engaging bottoms of the guide frames.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention.

FIGS. 4 and 5 shows perspective and top views, respectively, of an illustrative embodiment of the suspended upper internals.

DETAILED DESCRIPTION OF THE PREFERRED EMBODIMENTS

Figure 1:
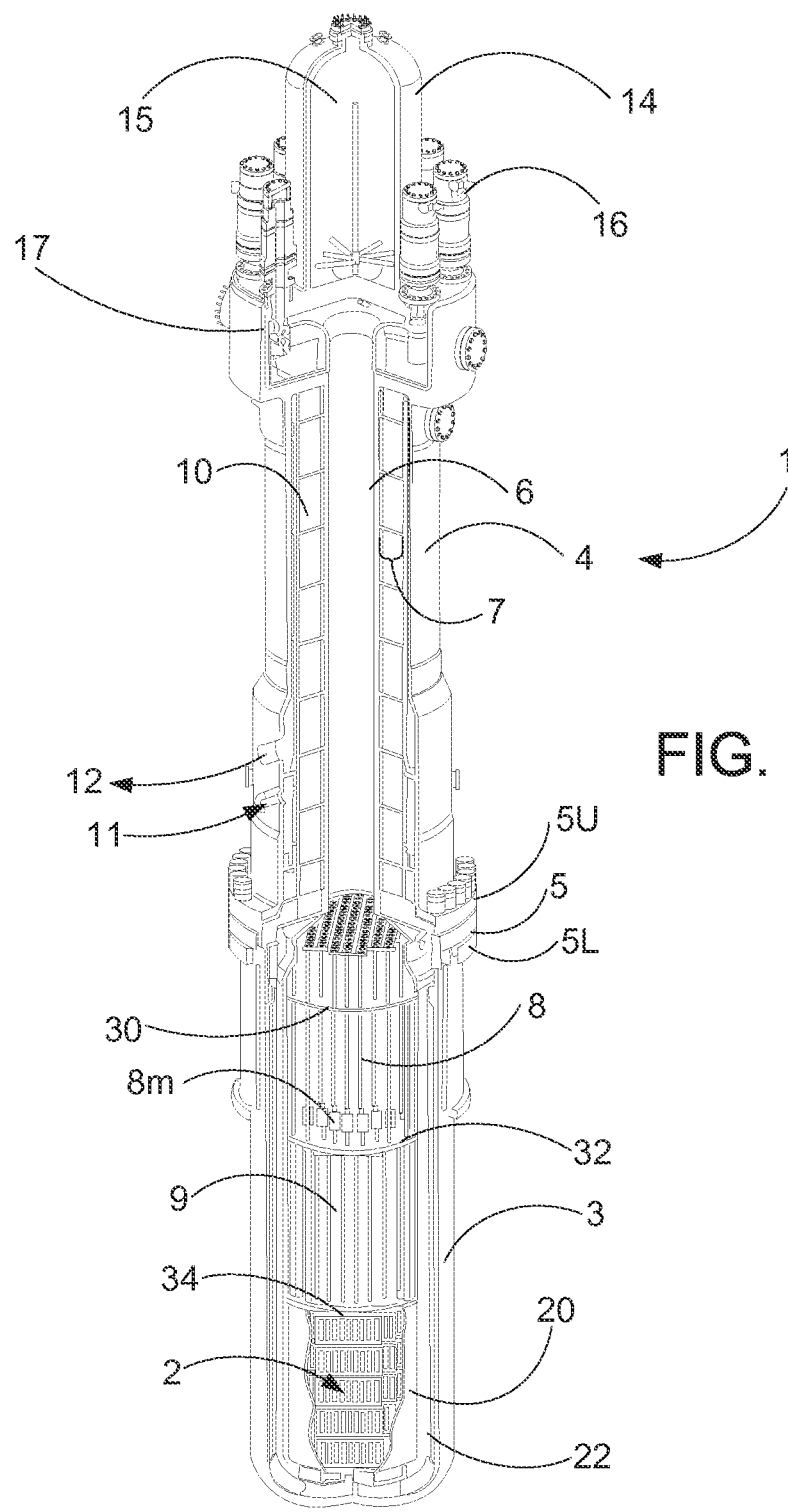
FIG. 1 illustrates a compact nuclear reactor in partial cutaway perspective view revealing selected internal components.

With reference to FIG. 1, a small modular reactor (SMR) 1 of the of the integral pressurized water reactor (PWR) variety is shown in partial cutaway to reveal selected internal components. The illustrative PWR 1 includes a nuclear reactor core 2 disposed in a pressure vessel comprising a lower vessel portion 3 and an upper vessel portion 4. The lower and upper vessel portions 3, 4 are connected by a mid-flange 5. Specifically, a lower flange 5L at the open top of the lower vessel portion 3 connects with the bottom of the mid-flange 5, and an upper flange 5U at the open bottom of the upper vessel portion 4 connects with a top of the mid-flange 5.

The reactor core 2 is disposed inside and at or near the bottom of the lower vessel portion 3, and comprises a fissile material (e.g., $^{235}$U) immersed in primary coolant water. A cylindrical central riser 6 is disposed coaxially inside the cylindrical pressure vessel and a downcomer annulus 7 is defined between the central riser 6 and the pressure vessel. The illustrative PWR 1 includes internal control rod drive mechanisms (internal CRDMs) 8 with internal motors 8$m$ immersed in primary coolant that control insertion of control rods to control reactivity. Guide frames 9 guide the translating control rod assembly (e.g., each including a set of control rods comprising neutron absorbing material yoked together by a spider and connected via a connecting rod with the CRDM). The illustrative PWR 1 employs one or more internal steam generators 10 located inside the pressure vessel and secured to the upper vessel portion 4, but embodiments with the steam generators located outside the pressure vessel (i.e., a PWR with external steam generators) are also contemplated. The illustrative steam generator 10 is of the once-through straight-tube type with internal economizer, and is fed by a feedwater inlet 11 and deliver steam to a steam outlet 12. See Malloy et al., U.S. Pub. No. 2012/0076254 A1 published Mar. 29, 2012 which is incorporated by reference in its entirety. The illustrative PWR 1 includes an integral pressurizer 14 at the top of the upper vessel section 4 which defines an integral pressurizer volume 15; however an external pressurizer connected with the pressure vessel via suitable piping is also contemplated. The primary coolant in the illustrative PWR 1 is circulated by reactor coolant pumps (RCPs) comprising in the illustrative example external RCP motors 16 driving an impeller located in a RCP plenum 17 disposed inside the pressure vessel.

Figures 2, 3:
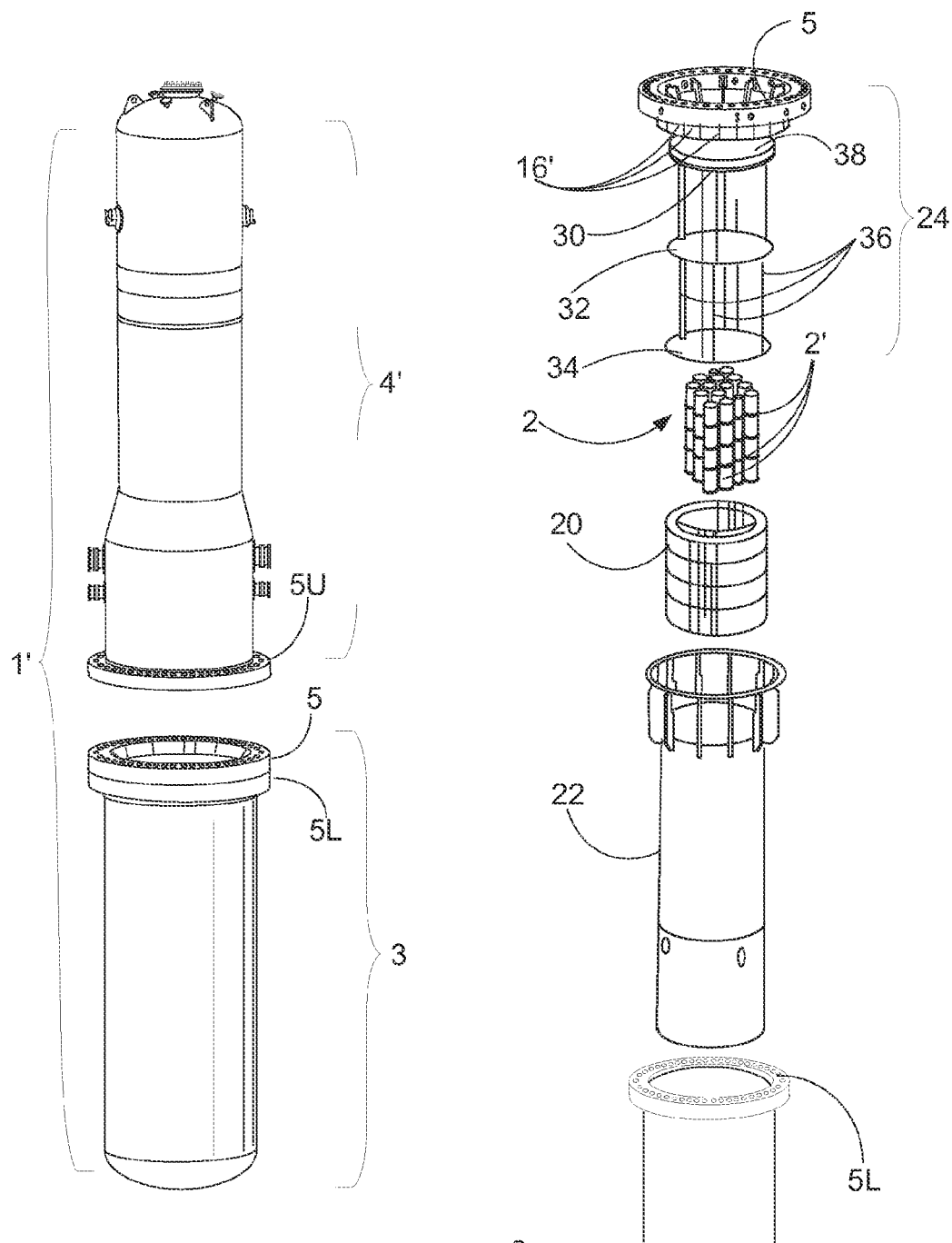
FIG. 2 illustrates a variant compact nuclear reactor in perspective view with the upper vessel lifted off.
FIG. 3 shows an exploded perspective view of the variant compact nuclear reactor of FIG. 2 showing principle internal components.

With reference to FIGS. 2 and 3, a variant PWR design 1' is shown, which differs from the PWR 1 of FIG. 1 by having a differently shaped upper vessel section 4' and internal RCPs 16' in place of the external pumps 16, 17 of the PWR 1. FIG. 2 shows the pressure vessel with the upper vessel section 4' lifted off, as is done during refueling. The mid-flange 5 remains disposed on the lower flange 5L of the lower vessel 3. FIG. 3 shows an exploded view of the lower vessel section 3 and principle components contained therein, including: the nuclear reactor core 2 comprising fuel assemblies 2' contained in a core former 20 disposed in a core basket 22.

With continuing reference to FIGS. 1 and 3 and with further reference to FIGS. 4 and 5, above the reactor core assembly 2, 20, 22 are the upper internals which include a suspended support assembly 24 comprising an upper hanger plate 30, a mid-hanger plate 32, and a lower hanger plate 34 suspended by tie rods 36 from the mid-flange 5. More particularly, in the illustrative embodiment the upper ends of the tie rods 36 are secured to a riser transition section 38 that is in turn secured with the mid-flange 5. The central riser 6 disposed in the upper vessel section 4, 4' (shown only in FIG. 1) is connected with the core basket 22 in the lower vessel section 3 by the riser cone (not shown) and riser transition section 38 to form a continuous hollow cylindrical flow separator between the columnar hot leg of the primary coolant path flowing upward and the cold leg that flows through the downcomer annulus surrounding the hot leg. The suspended support assembly 24 comprising hanger plates 30, 32, 34 interconnected by tie rods 36 provides the structural support for the CRDMs 8 and the guide frames 9 (note the CRDMs 8 and guide frames 9 are omitted in FIG. 3). The CRDMs 8 are disposed between the upper hanger plate 30 and the mid-hanger plate 32, and are either (1) top-supported in a hanging fashion from the upper hanger plate or (2) bottom-supported on the mid-hanger plate 32 (as in the illustrative embodiments described herein). Lateral support for the CRDMs 8 is provided by both plates 30, 32. (Note that in the illustrative embodiment, the CRDMs 8 actually pass through openings of the upper hanger plate 30 so that the tops of the CRDMs 8 actually extend above the upper hanger plate 30, as best seen in FIG. 1). The guide frames 9 are disposed between the mid-hanger plate 32 and the lower hanger plate 34, and are likewise either (1) top-supported in a hanging fashion from the mid-hanger plate 32 (as in the illustrative embodiments described herein) or (2) bottom-supported on the lower hanger plate. Lateral support for the guide frames 9 is provided by both plates 32, 34.

One of the hanger plates, namely the mid-hanger plate 32 in the illustrative embodiments, also includes or supports a distribution plate that includes mineral insulated cabling (MI cables) for delivering electrical power to the CRDM motors 8M and, in some embodiments, hydraulic lines for delivering hydraulic power to scram latches of the CRDMs 8. In the embodiment of FIGS. 2 and 3 (and as seen in FIG. 3), the internal RCPs 16' are also integrated into the upper internals assembly 24, for example on an annular pump plate providing both separation between the suction (above) and discharge (below) sides of the RCPs 16' and also mounting supports for the RCPs 16'.

The disclosed upper internals have numerous advantages. The suspension frame 24 hanging from the mid-flange 5 is a self-contained structure that can be lifted out of the lower vessel section 3 as a unit during refueling. Therefore, the complex assembly of CRDMs 8, guide frames 9, and ancillary MI cabling (and optional hydraulic lines) does not need to be disassembled during reactor refueling. Moreover, by lifting the assembly 5, 24, 8, 9 out of the lower vessel 3 as a unit (e.g. using a crane) and moving it to a suitable work stand, maintenance can be performed on the components 5, 24, 8, 9 simultaneously with the refueling, thus enhancing efficiency and speed of the refueling. The tensile forces in the tie rods 36 naturally tend to laterally align the hanger plates 30, 32, 34 and thus the mounted CRDMs 8 and guide frames 9.

The upper internals are thus a removable internal structure that is removed as a unit for reactor refueling. The upper internals basket (i.e., the suspension frame 24) is advantageously flexible to allow for movement during fit-up when lowering the upper internals into position within the reactor. Toward this end, the horizontal plates 30, 32, 34 are positioned at varying elevations and are connected to each other, and the remainder of the upper internals, via the tie rods 36. The design of the illustrative upper internals basket 24 is such that the control rod guide frames 9 are hung from the mid-hanger plate 32 (although in an alternative embodiment the guide frames are bottom-supported by the lower hanger plate). In the top-supported hanging arrangement, the guide frames 9 are laterally supported at the bottom by the lower hanger plate 34. The upper internals are aligned with the core former 20 and/or core basket 22 to ensure proper fit-up of the fuel to guide frame interface. This alignment is achieved by keying features of the lower hanger plate 34.

Figures 6, 7:
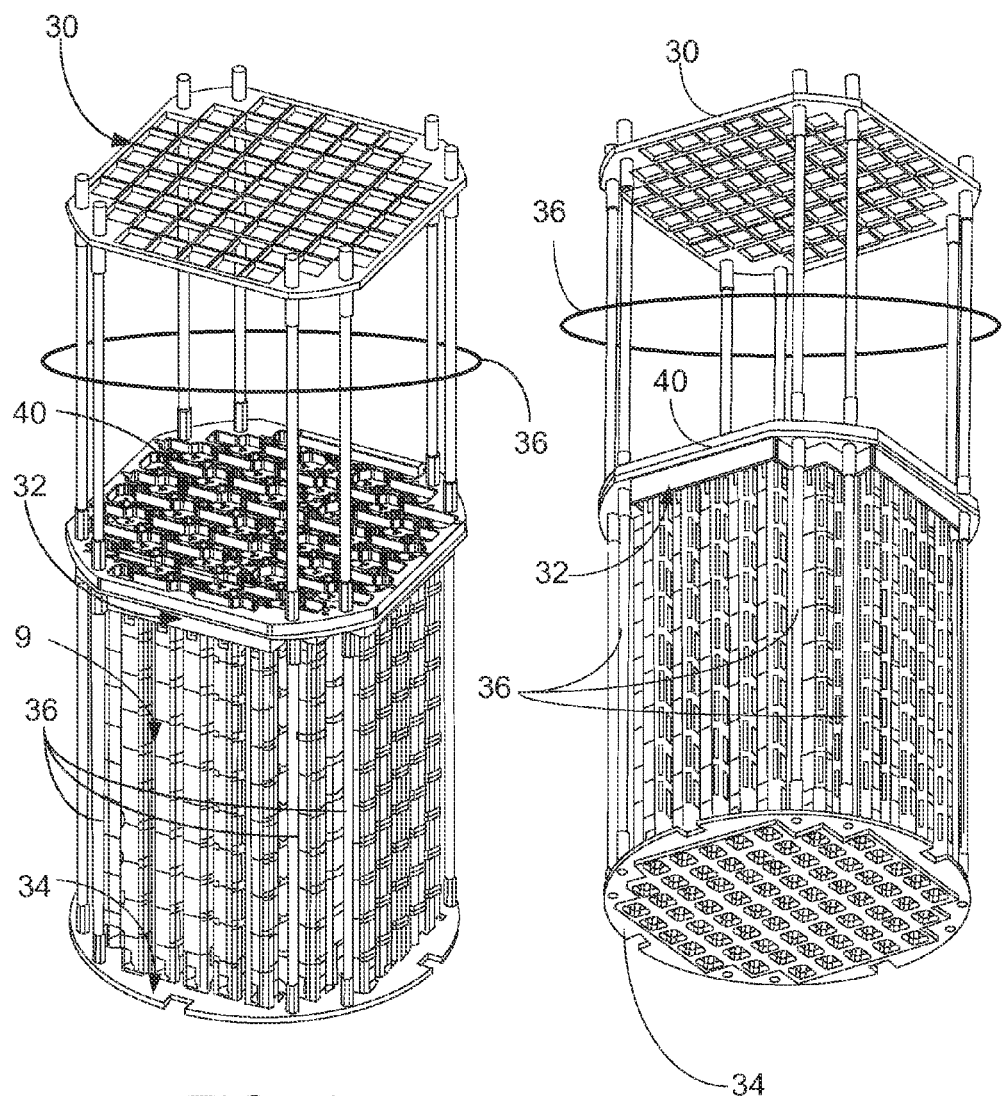
FIGS. 6 and 7 show alternative perspective views of the upper internals of FIGS. 4 and 5 with the control rod drive mechanisms (CRDMs) removed.

With reference to FIGS. 6 and 7, alternative perspective views are shown of the hanger plates 30, 32, 34 connected by tie rods 36 and with the guide frames 9 installed, but omitting the CRDMs 8 so as to reveal the top surface of the mid-hanger plate 32. In the illustrative embodiment, a distribution plate 40 is disposed on top of the mid-hanger plate 32, as best seen in FIG. 6. The distribution plate 40 is a load-transferring element that transfers (but does not itself support) the weight of the bottom-supported CRDMs 8 to the mid-hanger plate 32. This is merely an illustrative example, and the distribution plate can alternatively be integral with the mid-hanger plate (e.g., comprising MI cables embedded in the mid-hanger plate) or located on or in the upper hanger plate. (Placement of the distribution plate in the lower hanger plate is also contemplated, but in that case MI cables would need to run from the distribution plate along the outsides of the guide frames to the CRDMs.

As yet another option, the distribution plate can be omitted entirely in favor of discrete MI cables run individually to the CRDMs 8).

Figure 8:
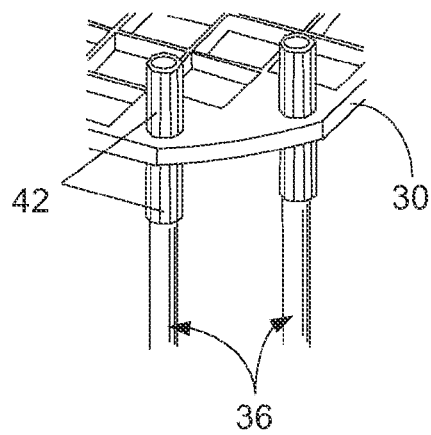
FIG. 8 shows an enlarged perspective view of two tie rod couplings of the upper internals of FIGS. 4 and 5.

With reference to FIG. 8, which shows a corner of the upper hanger plate 30 as an illustrative example, the tie rods 36 are coupled to each plate by tie rod couplings 42, which optionally incorporate a turnbuckle (i.e. length adjusting) arrangement as described elsewhere herein. Note that the ends of the tie rods connect with a hanger plate, with no hanger plate connecting at a middle of a tie rod. Thus, the upper tie rods 36 extend between the upper and mid-hanger plates 30, 32 with their upper ends terminating at tie rod couplings 42 at the upper hanger plate 30 and their lower ends terminating at tie rod couplings 42 at the mid-hanger plate 32; and similarly, the lower tie rods 36 extend between the mid-hanger plate 32 and the lower hanger plate 34 with their upper ends terminating at tie rod couplings 42 at the mid-hanger plate 32 and their lower ends terminating at tie rod couplings 42 at the lower hanger plate 34.

Figure 9:
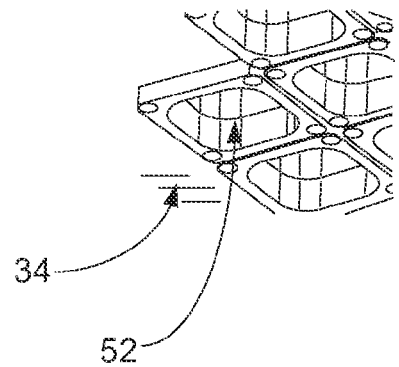
FIG. 9 shows an enlarged perspective view from below of the lower hanger plate showing guide frame bottom cards.
Figure 10:
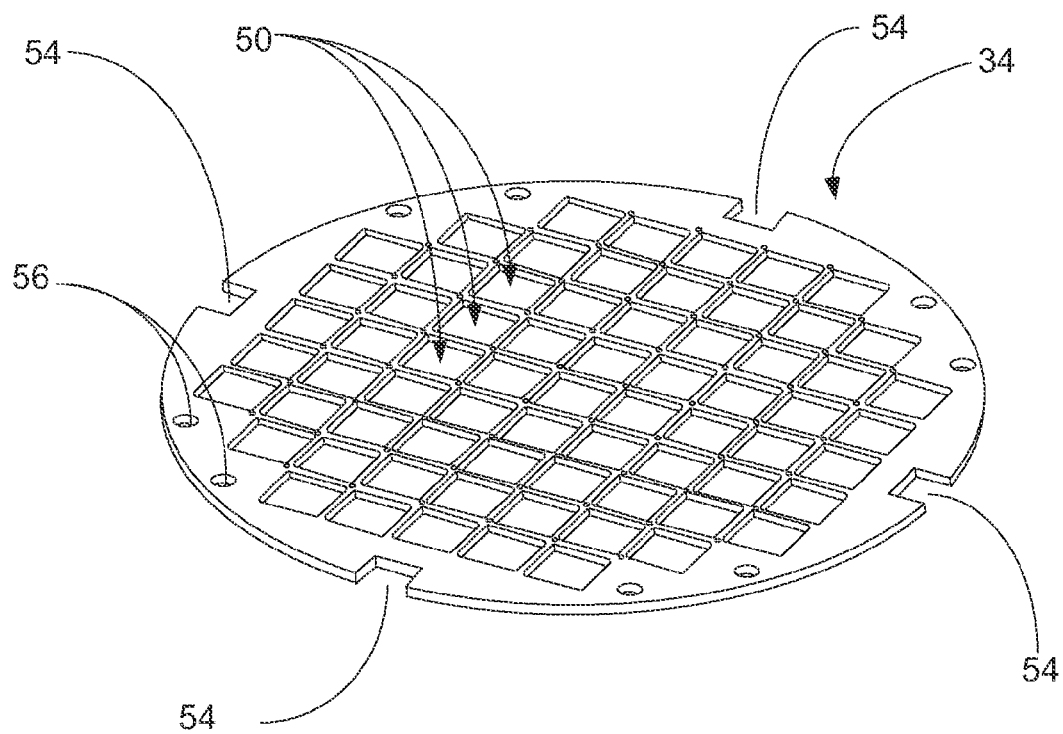
FIG. 10 shows a perspective view of the lower hanger plate of the upper internals of FIGS. 4 and 5.

With reference to FIGS. 9 and 10, the lower hanger plate 34 in the illustrative embodiment provides only lateral support for the guide frames 9 which are top-supported in hanging fashion from the mid-hanger plate 32. Consequentially, the lower hanger plate 34 is suitably a single plate with openings 50 that mate with the bottom ends of the guide frames (see FIG. 10). To simplify the alignment, in some embodiments guide frame bottom cards 52 (see FIG. 9) are inserted into the openings 50 and are connected with the bottom ends of the guide frames 9 by fasteners, welding, or another technique. (Alternatively, the ends of the guide frames may directly engage the openings 50 of the lower hanger plate 34).

In addition to providing lateral support for each control rod guide frame 9, locking each in laterally with a honeycomb-type structure (see FIG. 10), the lower hanger plate 34 also includes alignment features 54 (see FIG. 10) that align the upper internals with the core former 20 or with the core basket 22. The illustrative alignment features are peripheral notches 54 that engage protrusions (not shown) on the core former 20; however, other alignment features can be employed (e.g., the lower hanger plate can include protrusions that mate with notches of the core former). Also seen in FIG. 10 are peripheral openings 56 in the lower hanger plate 34 into which the tie rod couples 42 of the lower hanger plate fit. The lower hanger plate 34 is suitably machined out of plate material or forging material. For example, in one contemplated embodiment the lower hanger plate 34 is machined from 304L steel plate stock.

Figure 11:
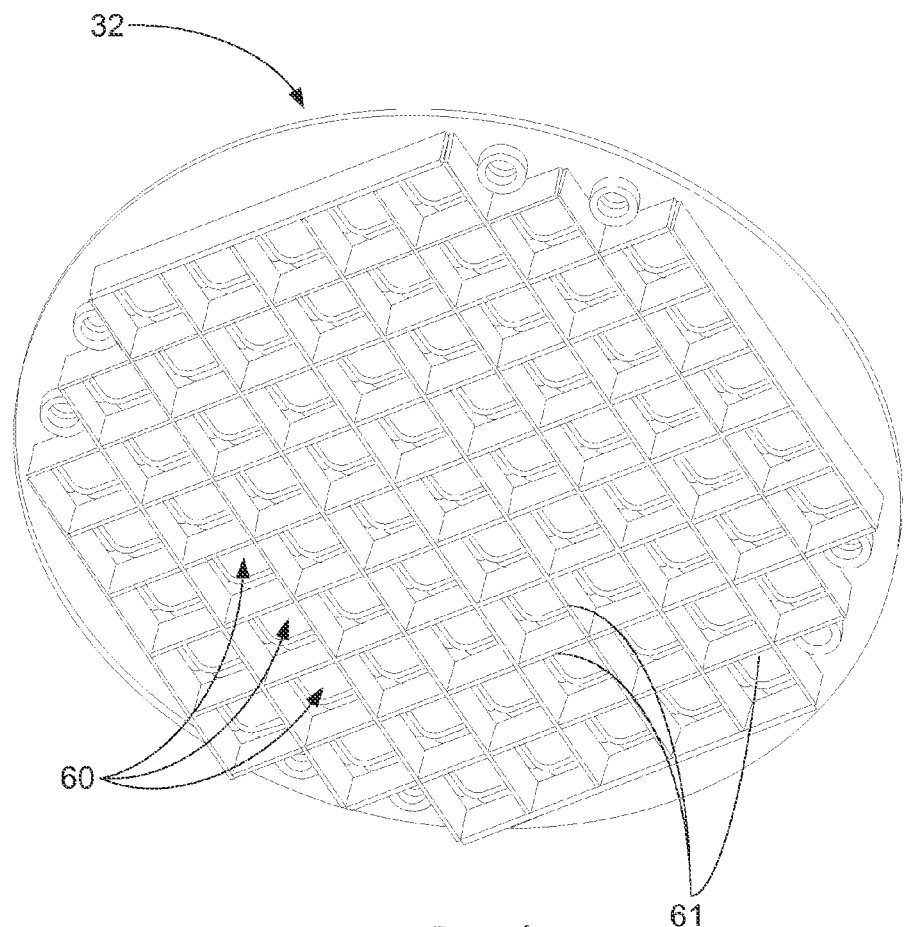
FIG. 11 shows a perspective view from below of the mid-hanger plate of the upper internals of FIGS. 4 and 5.

With continuing reference to FIGS. 6 and 7 and with further reference to FIG. 11, the mid-hanger plate 32 provides top support for the guide frames 9 and bottom support for the CRDMs 8. The mid-hanger plate 32 acts as a load distributing plate taking the combined weight of the CRDMs 8 and the guide frames 9 and transferring that weight out to the tie rods 36 on the periphery of the upper internals basket 24. In the illustrative embodiment, the power distribution plate 40 is also bottom supported. Like the lower hanger plate 34, the mid-hanger plate 32 includes openings 60. The purpose of the openings 60 is to enable the connecting rod, translating screw, or other coupling mechanism to connect each CRDM 8 with the control rod assembly driven by the CRDM. To facilitate hanging the guide frames 9 off the bottom of the mid-hanger plate 32, an egg crate-type structure made of orthogonally intersecting elements 61 is provided for increased strength and reduced deflection due to large loads.

Figure 12:
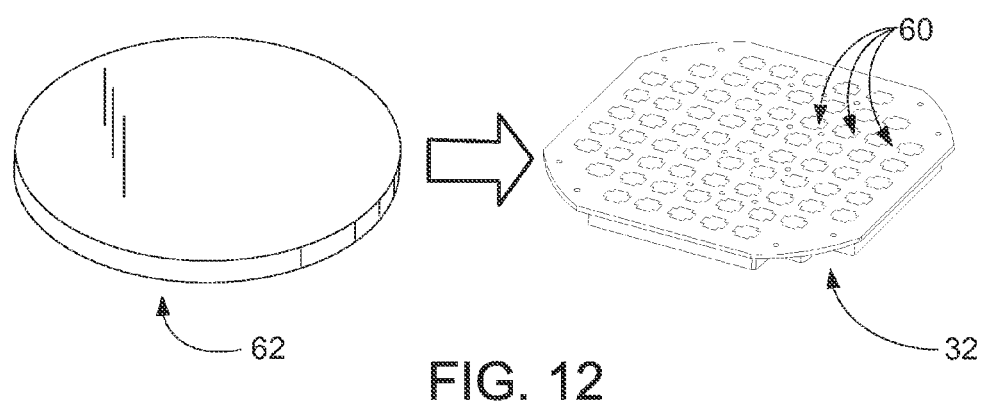
FIGS. 12 and 13 illustrate alternative embodiments for manufacturing the mid-hanger plate of FIG. 11.
Figure 13:
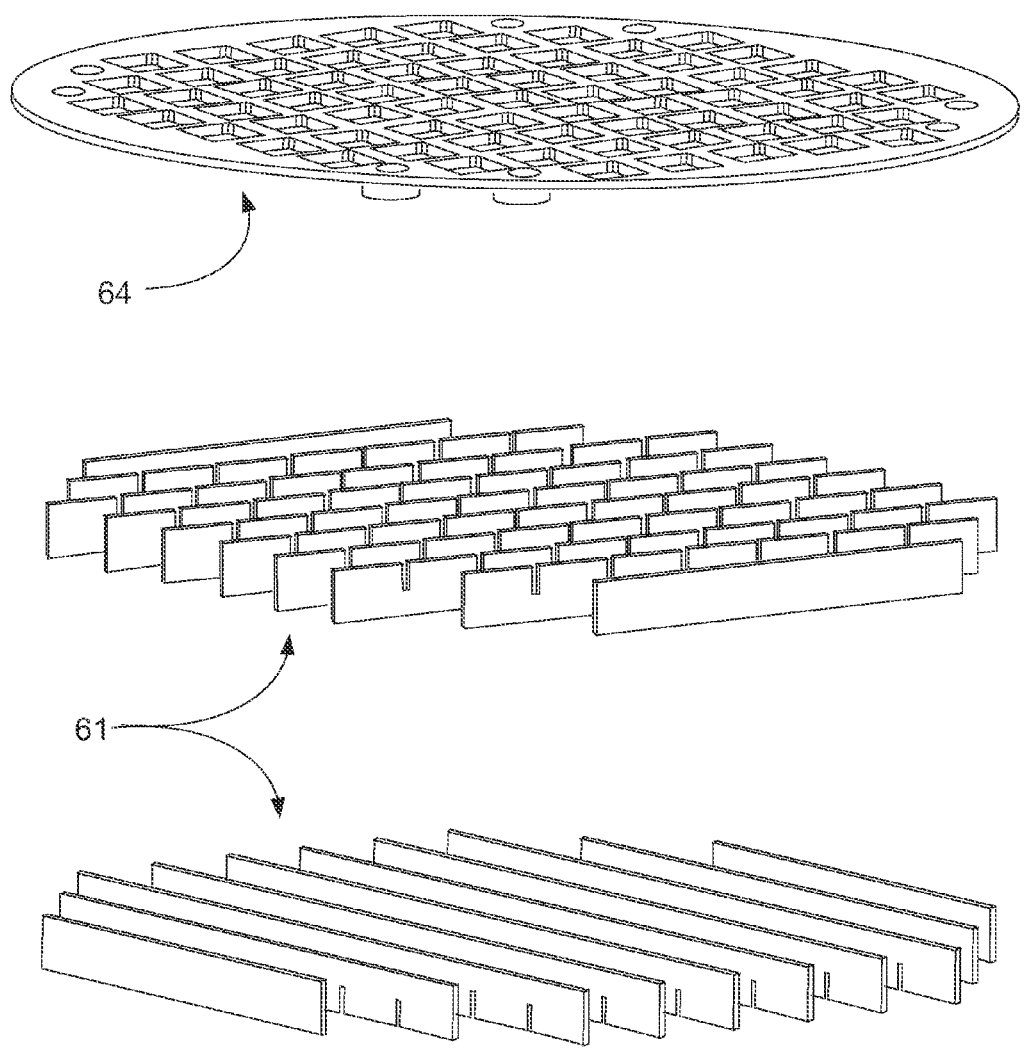

With reference to FIGS. 12 and 13, the mid-hanger plate 32 can be manufactured in various ways. In one approach (FIG. 12), a forging machining process is employed to machine the mid-hanger plate 32 out of a 304L steel forged plate 62. The machining forms the openings 60 and the intersecting elements 61. In another approach (FIG. 13), a machined plate 64 and the intersecting elements 61 are manufactured as separate components, and the intersecting elements 61 are interlocked using mating slits formed into the intersecting elements 61 and welded to each other and to the machined plate 64 to form the mid-hanger plate 32. As previously noted, the illustrative bottom-supported distribution plate 40 can alternatively be integrally formed into the mid-hanger plate.

Figure 14:
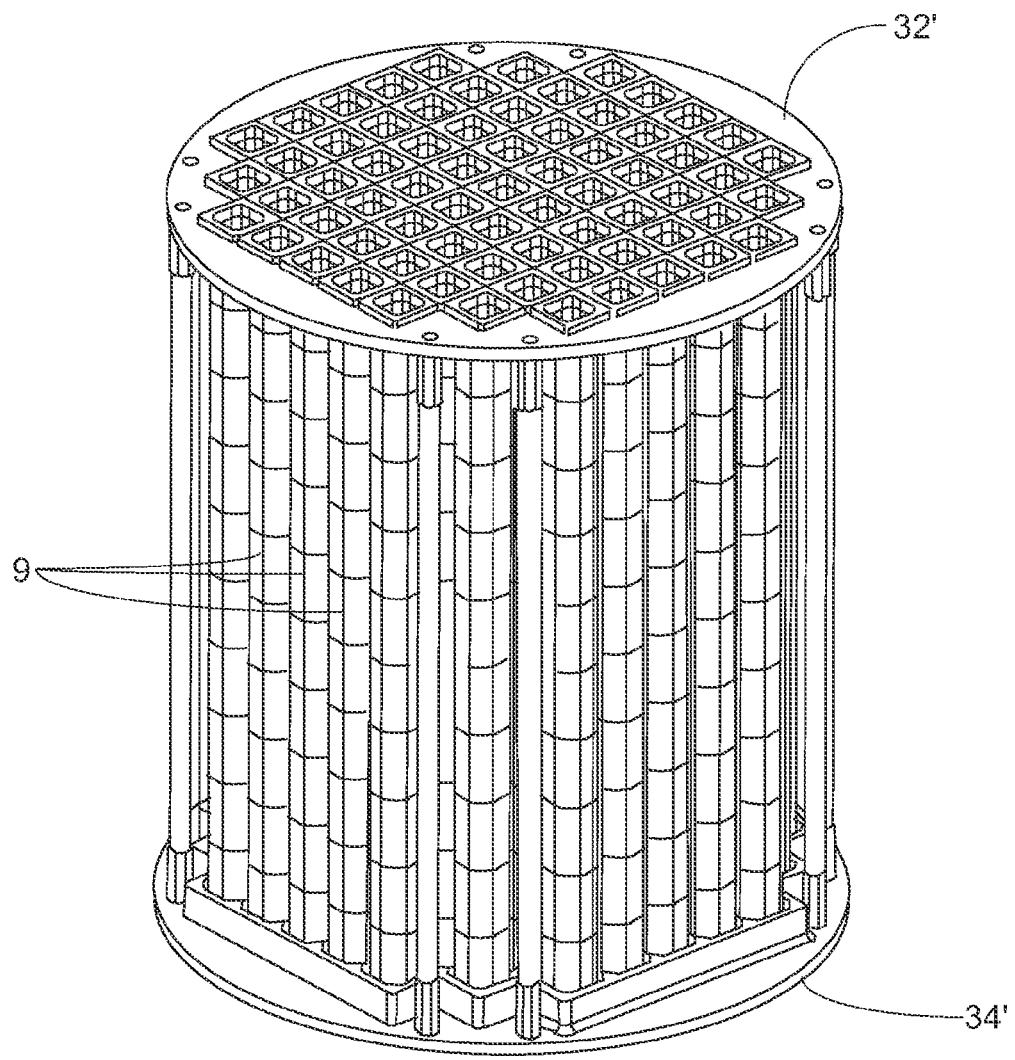
FIG. 14 illustrates an alternative embodiment in which the guide frames are bottom-supported by the lower hanger plate.

With reference to FIG. 14, in an alternative embodiment the guide frames 9 are bottom supported by an alternative lower hanger plate 34', and are laterally aligned at top by an alternative mid-hanger plate 32'. In this case the alternative lower hanger plate 34' may have the same form and construction as the main embodiment mid-hanger plate 32 of FIGS. 11-13 (but with suitable alignment features to align with the core former and/or core basket, not shown in FIG. 14), and the alternative mid-hanger plate 32' can have the same form and construction as the main embodiment lower hanger plate 34 of FIG. 10 (but without said alignment features). If the CRDMs remain bottom supported, then the alternative mid-hanger plate 32' should be made sufficiently thick (or otherwise sufficiently strong) to support the weight of the CRDMs. As another variant, the alternative mid-hanger plate 32' can be made too thin to directly support the CRDMs, and an additional thicker upper plate added to support the weight of the CRDMs. In this case the thicker plate would be the one connected with the tie rods to support the CRDMs.

In the illustrative embodiments, the guide frames 9 are continuous columnar guide frames 9 that provide continuous guidance to the translating control rod assemblies. See Shargots et al, "Support Structure for a Control Rod Assembly of a Nuclear Reactor", U.S. Pub. No. 2012/0099691 A1 published Apr. 26, 2012 which is incorporated herein by reference in its entirety. However, the described suspended frame 24 operates equally well to support more conventional guide frames comprising discrete plates held together by tie rods. Indeed, the main illustrative approach in which the guide frames are top-supported in hanging fashion from the mid-hanger plate 32 is particularly well-suited to supporting conventional guide frames, as the hanging arrangement tends to self-align the guide frame plates.

Figure 15:
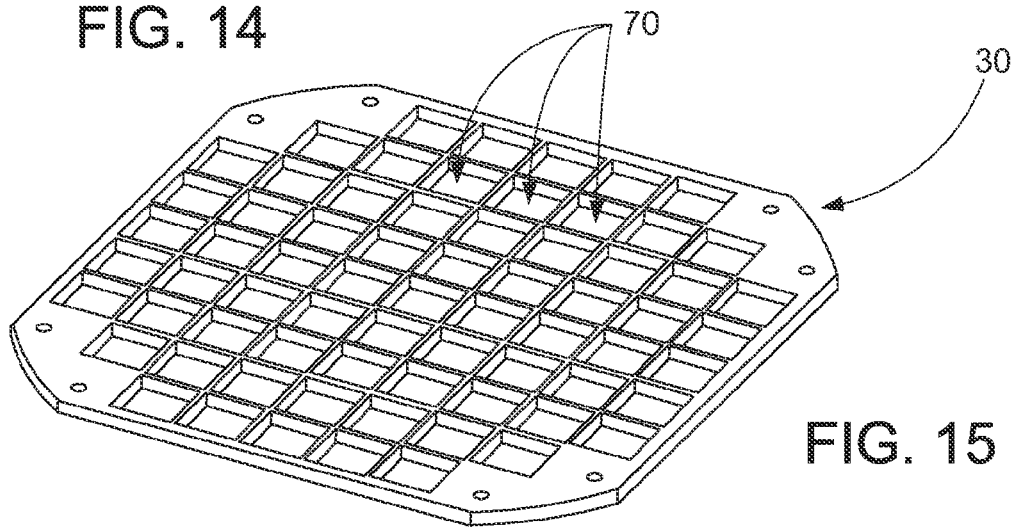
FIG. 15 shows a perspective view of the upper hanger plate of the upper internals of FIGS. 4 and 5.

With reference to FIG. 15, an illustrative embodiment of the upper hanger plate 30 is shown. Like the other hanger plates 32, 34, the upper hanger plate 30 includes openings 70, in this case serving as passages through which the upper ends of the CRDMs 8 pass. The inner periphery of each opening 70 serves as a cam to laterally support and align the upper end of the CRDM 8. The upper hanger plate 30 can also suitably be made by machining from either plate material or forging material, e.g. a 304L steel plate stock or forging.

Figure 16:
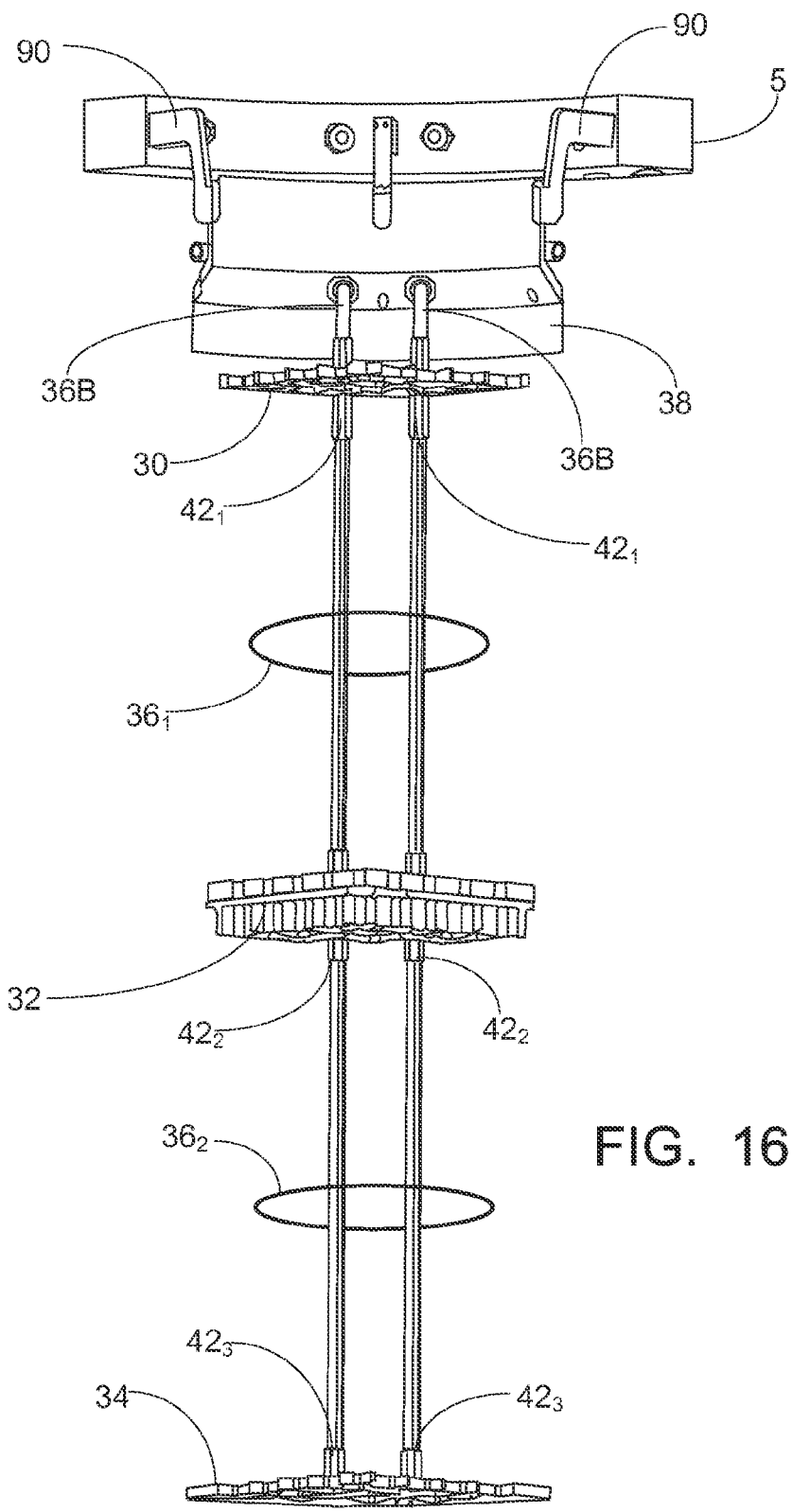
FIG. 16 shows a side view of the suspended support assembly of the upper internals of FIGS. 4 and 5.
Figure 17:
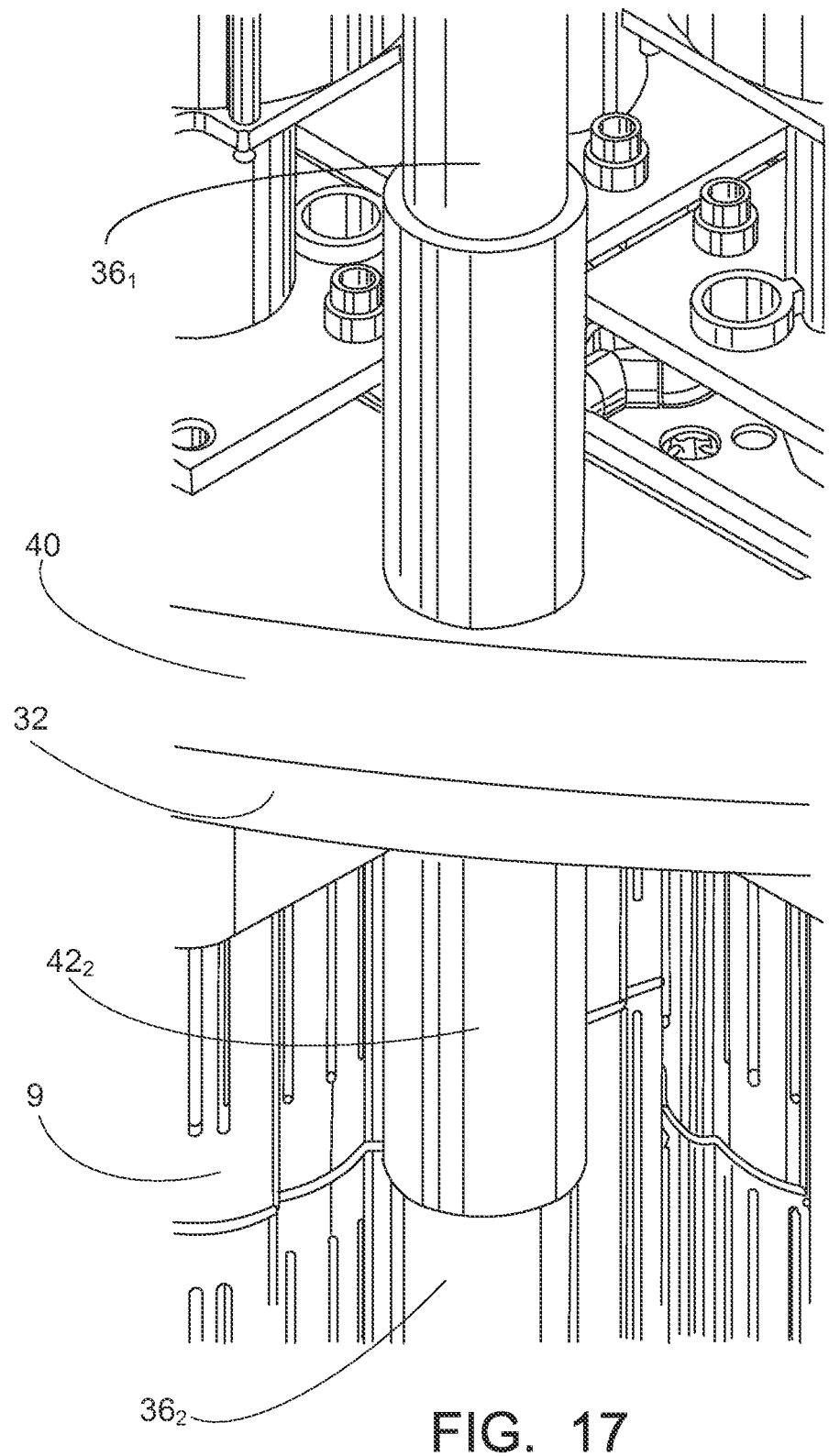
FIGS. 17 and 18 shows enlarged perspective and enlarged perspective cutaway views, respectively, of one of the tie rod couplings of FIG. 16.
Figure 18:
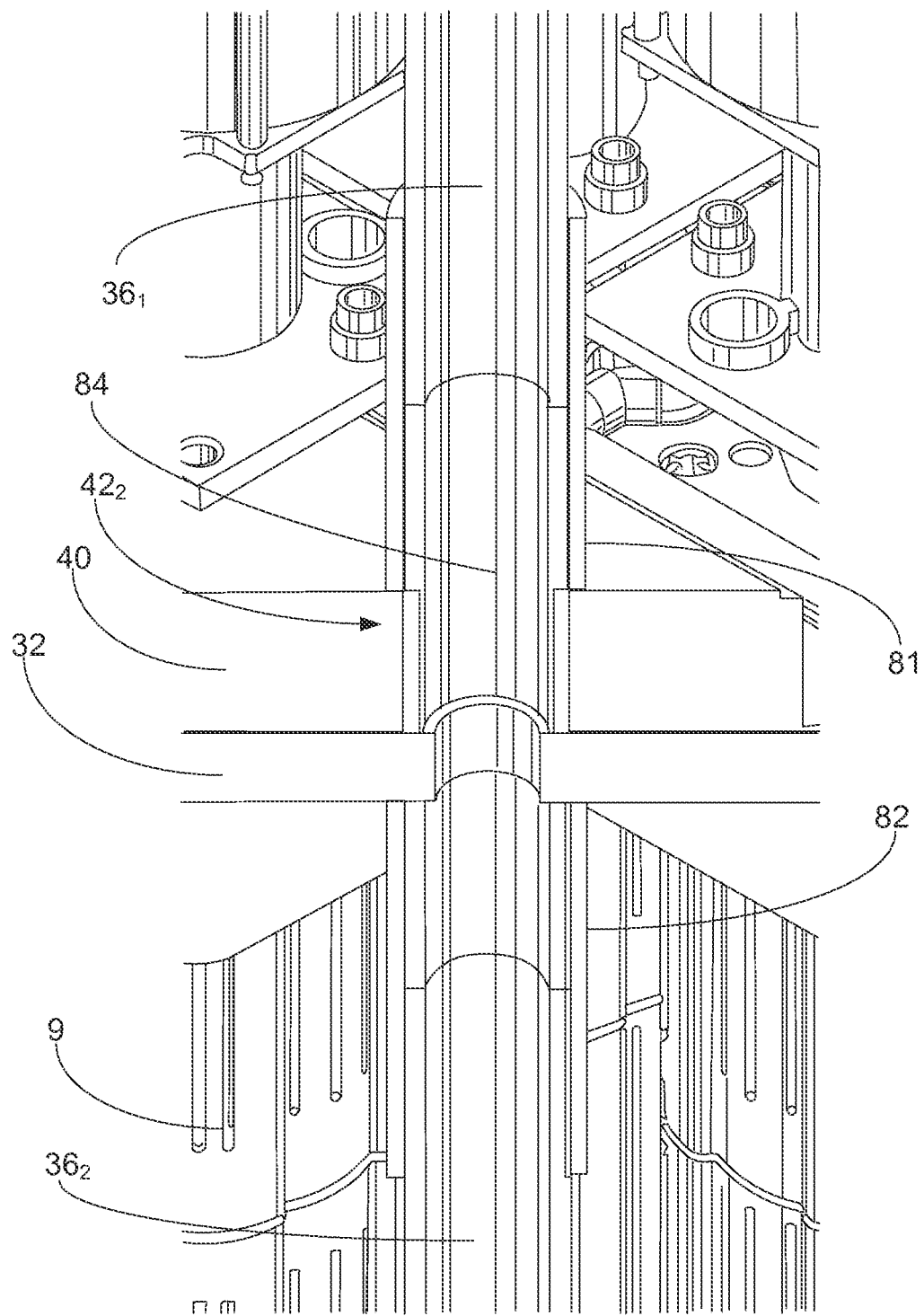

With reference to FIGS. 16-18, the tie bar (alternatively "tie rod") couplings 42 are further described. FIG. 16 shows the suspended frame 24 including the upper, mid-, and lower hanger plates 30, 32, 34 held together by tie rods 36. For clarity, the tie bars are denoted in FIG. 16 as upper tie bars $36_1$ and lower tie bars $36_2$, and the various levels of tie bar couples are denoted as upper tie bar couples $42_1$, middle tie bar couples $42_2$, and lower tie bar couples $42_3$. At the upper end, short tie rods (i.e. tie rod bosses) 36B have upper ends welded to the riser transition 38 and have lower ends threaded into the tops of upper tie bar couplings $42_1$. The upper tie bars $36_1$ have their upper ends threaded into the bottoms of upper tie bar couplings $42_1$ and have their lower ends threaded into the tops of middle tie bar couplings $42_2$. The lower tie bars $36_2$ have their upper ends threaded into the bottoms of middle tie bar couplings $42_2$ and have their lower ends threaded into the tops of lower tie bar couplings $42_3$.

FIGS. 17 and 18 show perspective and sectional perspective views, respectively, of the middle tie bar coupling $42_2$. As best seen in FIG. 18, the tie rod coupling $42_2$ has a turnbuckle (i.e. length adjusting) configuration including outer sleeves 81, 82 having threaded inner diameters that engage (1) the threaded outsides of the ends of the respective mating tie rods $36_1$, $36_2$, and (2) the threaded outsides of a plate thread feature 84. Thus, by rotating the outer sleeve 81 the position of tie rod $36_1$ respective to the mid-hanger plate 32 can be adjusted; and similarly, by rotating the outer sleeve 82 the position of tie rod $36_2$ respective to the mid-hanger plate 32 can be adjusted. (Note that the plate thread feature 84 can be a single element passing through the mid-hanger plate 32, or alternatively can be upper and lower elements extending above and below the mid-hanger plate 32, respectively). The tie bar coupling $42_1$ is the same as tie bar coupling $42_2$ except that the upper outer sleeve 81 suitably engages the tie rod boss 36B; while, the tie bar coupling 42 is the same as tie bar coupling $42_2$ but omits the lower half (i.e. lower outer sleeve 82 and the corresponding portion of the plate thread feature 84), since there is no tie rod "below" for the tie bar coupling $42_3$ to engage.

Said another way, the tie rod coupling portions 81, 82 can be threaded on their inner diameter with threads matching that of the outer diameter of the tie rods 36 and on the threading feature 84 of any of the plates 30, 32, 34 or riser transition 38. This allows the coupling 42 to be threaded onto the tie rod 36 and onto the threading feature 84 of any other component. The advantages to a coupling such as this is that a very accurate elevation can be held with each of the above mentioned components 30, 32, 34, 38 within the upper internals, and that each of the above components can hold a very accurate parallelism with one another. Essentially, the couplings allow for very fine adjustments during the final assembly process. They also allow for a quick and easy assembly process. Another advantage to the couplings 42 is that they allow for the upper internals to be separated at the coupling joints fairly easily for field servicing or decommissioning of the nuclear power plant.

In an alternative tie rod coupling approach, it is contemplated for the tie rods to be directly welded to any of the plates or riser transition, in which case the tie rod couplings 42 would be suitably omitted. However, this approach makes it difficult to keep the tie rod perpendicular to the plates making assembly of the upper internals more difficult. It also makes breaking the upper internals down in the field more difficult.

Figure 19:
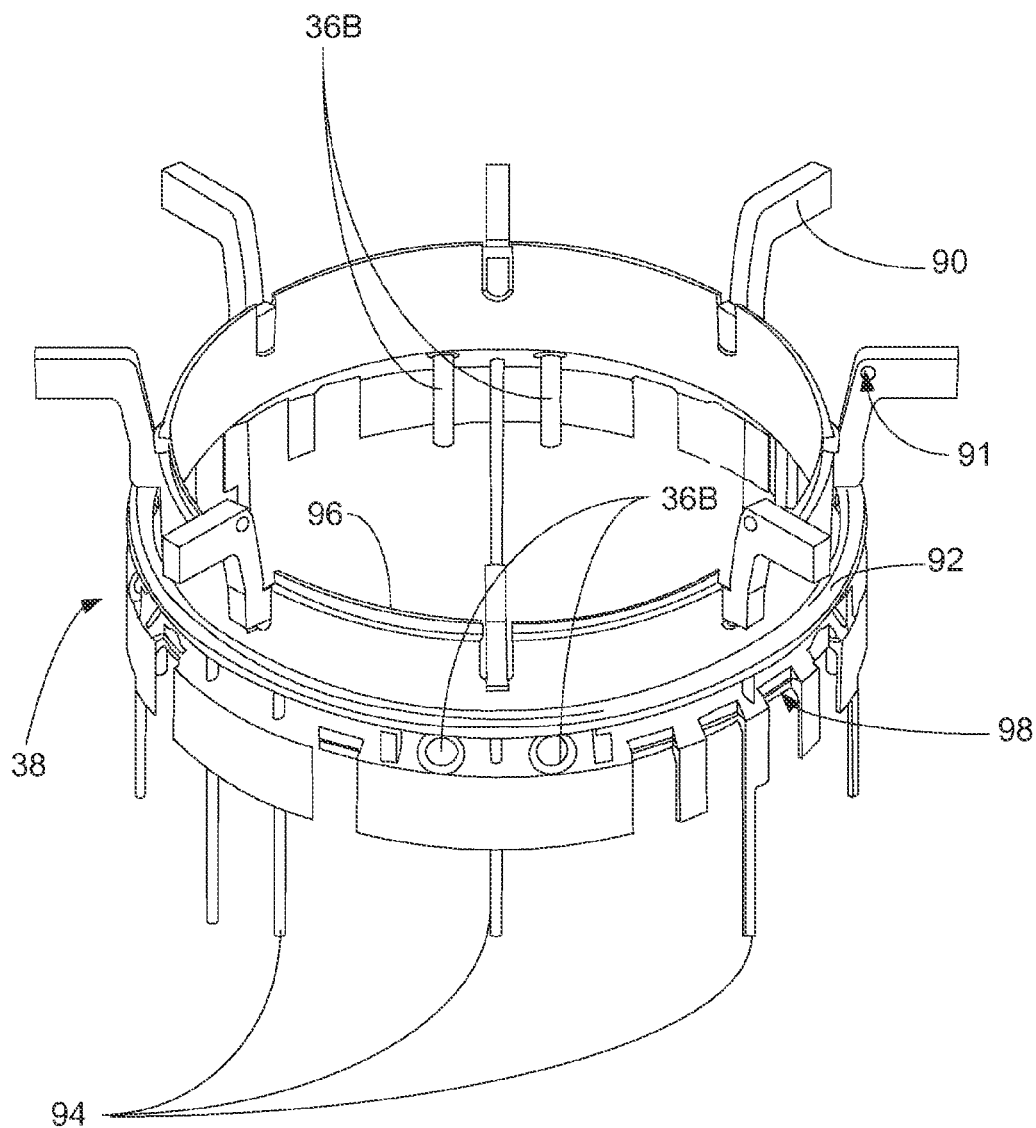
FIG. 19 shows a perspective view of the riser transition section from which the upper internals are suspended.

With reference to FIG. 19, the riser transition 38 is shown in perspective view. The riser transition assembly 38 performs several functions. The riser transition 38 provides load transfer from the tie rods 36 of the upper internals basket 24 to the mid-flange 5 of the reactor pressure vessel. Toward this end, the riser transition 38 includes gussets 90 by which the riser transition 38 is welded to the mid-flange 5. (See also FIGS. 4 and 5 showing the riser transition 38 with gussets 90 welded to the mid-flange 5). One or more of these gussets 90 may include a shop lifting lug 91 or other fastening point to facilitate transport, for example when the upper internals are lifted out during refueling. The load transfer from the tie rods 36 to the mid-flange 5 is mostly vertical loading due to the overall weight of the upper internals. However, there is also some radial differential of thermal expansion between the riser transition gussets 90 and the mid-flange 5, and the riser transition 38 has to also absorb these thermal loads. As already mentioned, the riser cone and riser transition 38 also acts (in conjunction with the central riser 6 and core basket 22) as the flow divider between the hot leg and cold leg of the primary coolant loop. Still further, the riser transition 38 also houses or includes an annular hydraulic collection header 92 for supplying hydraulic power via vertical hydraulic lines 94 to the CRDMs (in the case of embodiments employing hydraulically driven scram mechanisms). The riser transition 38 also has an annular interface feature 96 for fit-up with the riser cone or other connection with the central riser 6, and feature cuts 98 to allow the passing of the CRDM electrical MI cable.

With brief returning reference to FIGS. 4 and 5, the gussets 90 are suitably welded to the mid-flange 5 at one end and welded to the main body portion of the riser transition assembly 38 at the other end. The riser transition 38 is suitably made of 304L steel, in some embodiments, e.g. by machining from a ring forging.

Figure 20:
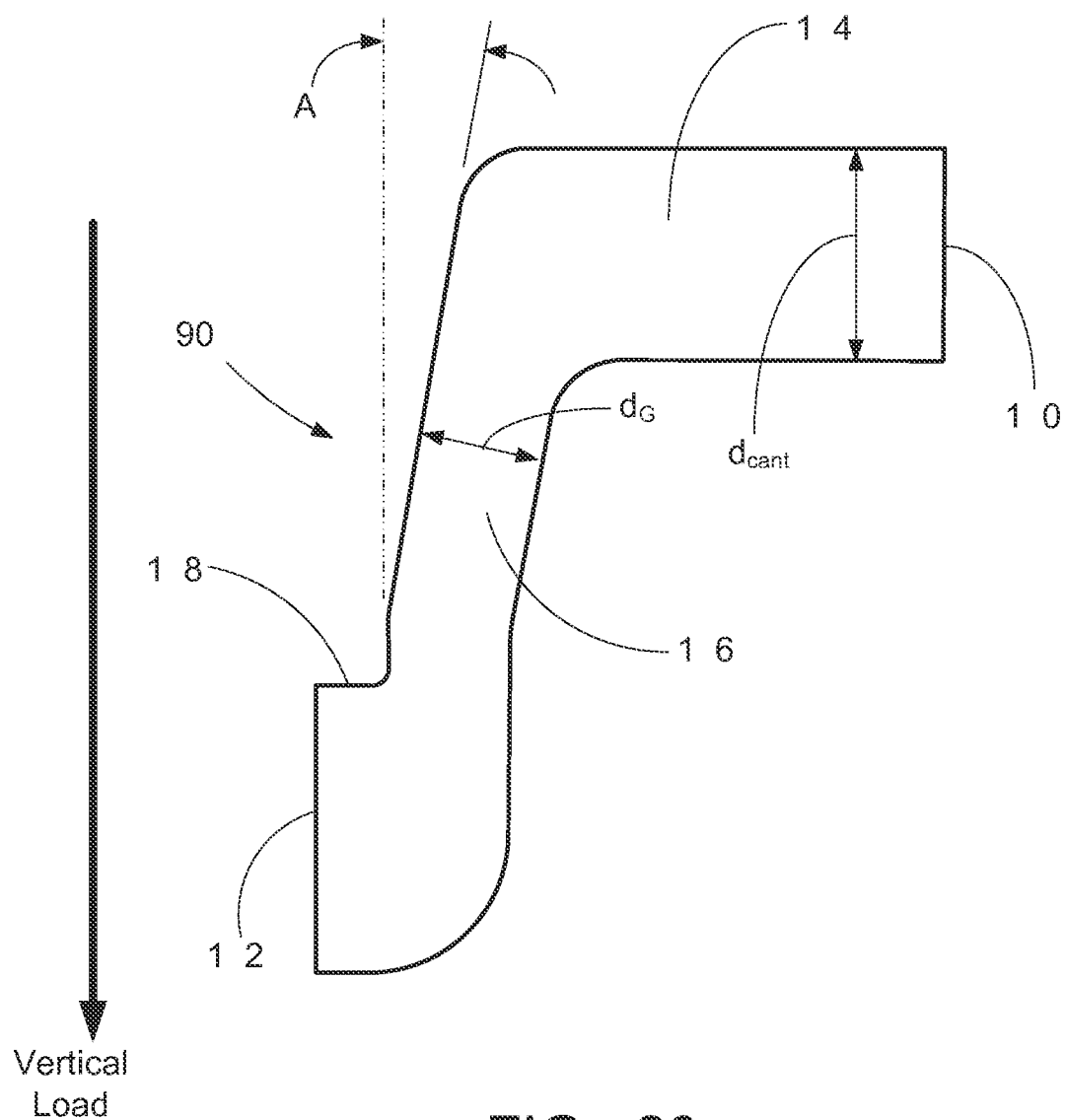
FIG. 20 shows a diagrammatic side view of one of the gussets of the riser transition section shown in FIG. 19.

With reference to FIG. 20, an illustrative gusset 90 is shown, having a first end 100 that is welded to the mid-flange 5 and a second end 102 that is welded to the riser transition 38 as already described. The gusset 90 includes horizontal cantilevered portion 104, and a tensile-strained portion 106 that angles generally downward, but optionally with an angle A indicated in FIG. 20. The horizontal cantilevered portion 104 has a thickness $d_{cant}$ that is relatively greater than a thickness $d_G$ of the tensile-strained portion 106. The thicker cantilevered portion 104 handles the vertical loading component, while the tensile-strained portion 106 allows the gusset 90 to deflect in the lateral direction to absorb lateral loading due to thermal expansion. The angle A of the tensile-strained portion 106 provides for riser cone lead-in. The end 102 of the gusset 90 that is welded to the riser transition 38 includes an upper ledge 108 that serves as a riser cone interface.

In the illustrative embodiments, the CRDMs 8 are bottom supported from the mid-hanger plate 32, and the tops of the CRDMs 8 are supported by the upper hanger plate 30, which serves as the lateral support for each CRDM, locking each in laterally with a honeycomb type structure (see FIG. 15). Even with this support structure, however, the CRDM 8 should be protected during an Operating Basis Earthquake (OBE) or other event that may cause mechanical agitation. To achieve this, it is desired to support the upper end of the CRDM to prevent excessive lateral motion and consequently excessive loads during an OBE. It is disclosed to employ a restraining device which still allows for ease of maintenance during an outage. Using spring blocks integrated into the CRDM 8 satisfies both of these requirements, as well as providing compliance that accommodates any differential thermal expansion.

Integrating compliance features into support straps of the CRDM 8 allows the CRDM's to be removed while still maintaining lateral support. As the CRDM is lowered into its mounting location the compliant features come into contact with the upper hanger plate 30. The compliance allows them to maintain contact with the upper hanger plate yet allow for misalignment between the CRDM standoff mounting point and the upper hanger plate. Their engagement into the upper hanger plate 30 allows them to be of sufficient height vertically from the mounting base of the CRDMs to minimize the loads experienced at the base in an OBE event. Having no feature that extends below the upper hanger plate allows the CRDM to be removed from the top for service.

Figure 21:
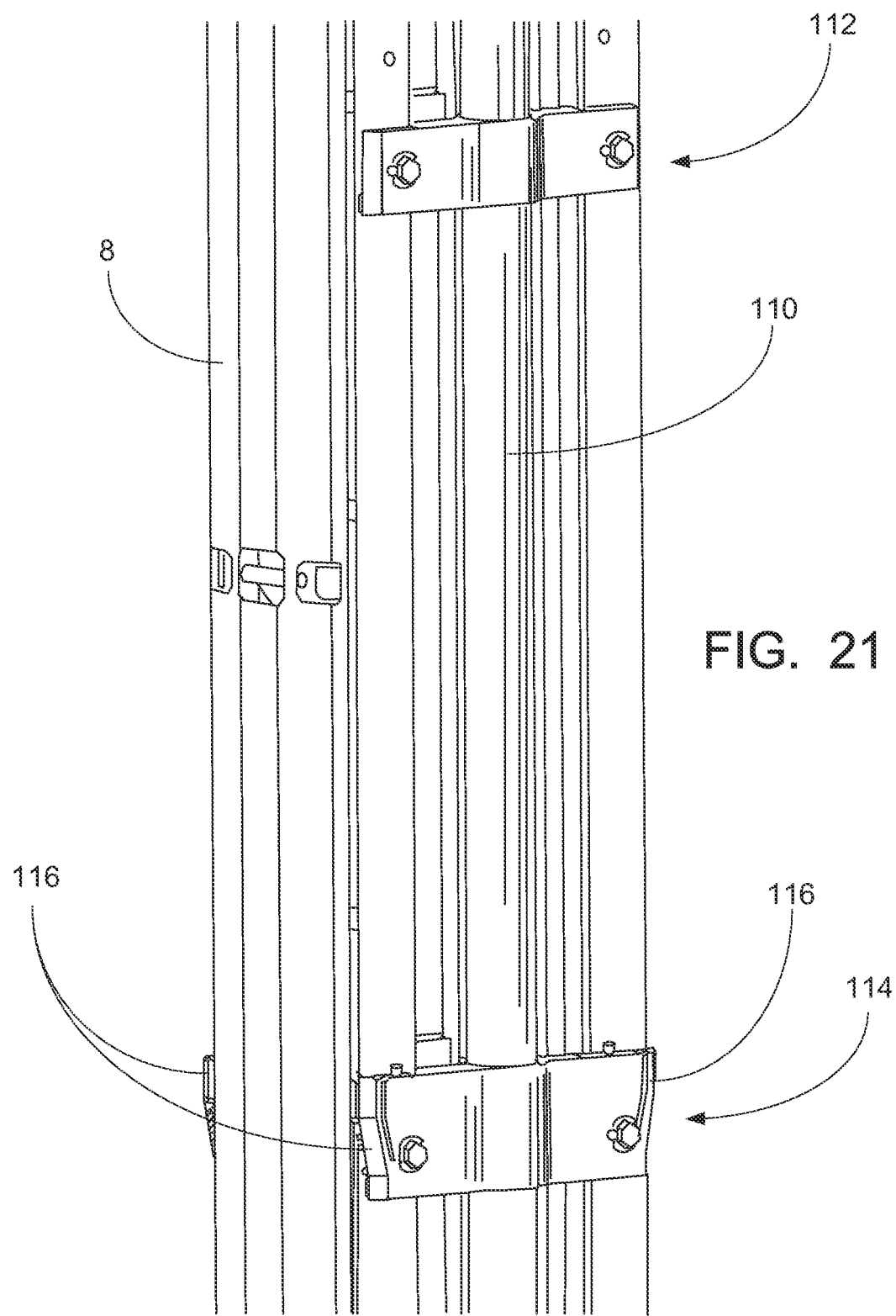
FIG. 21 shows a perspective view of an upper portion of a CRDM including straps retaining a hydraulic line in which one of the straps is modified to include compliance features.
Figure 22:
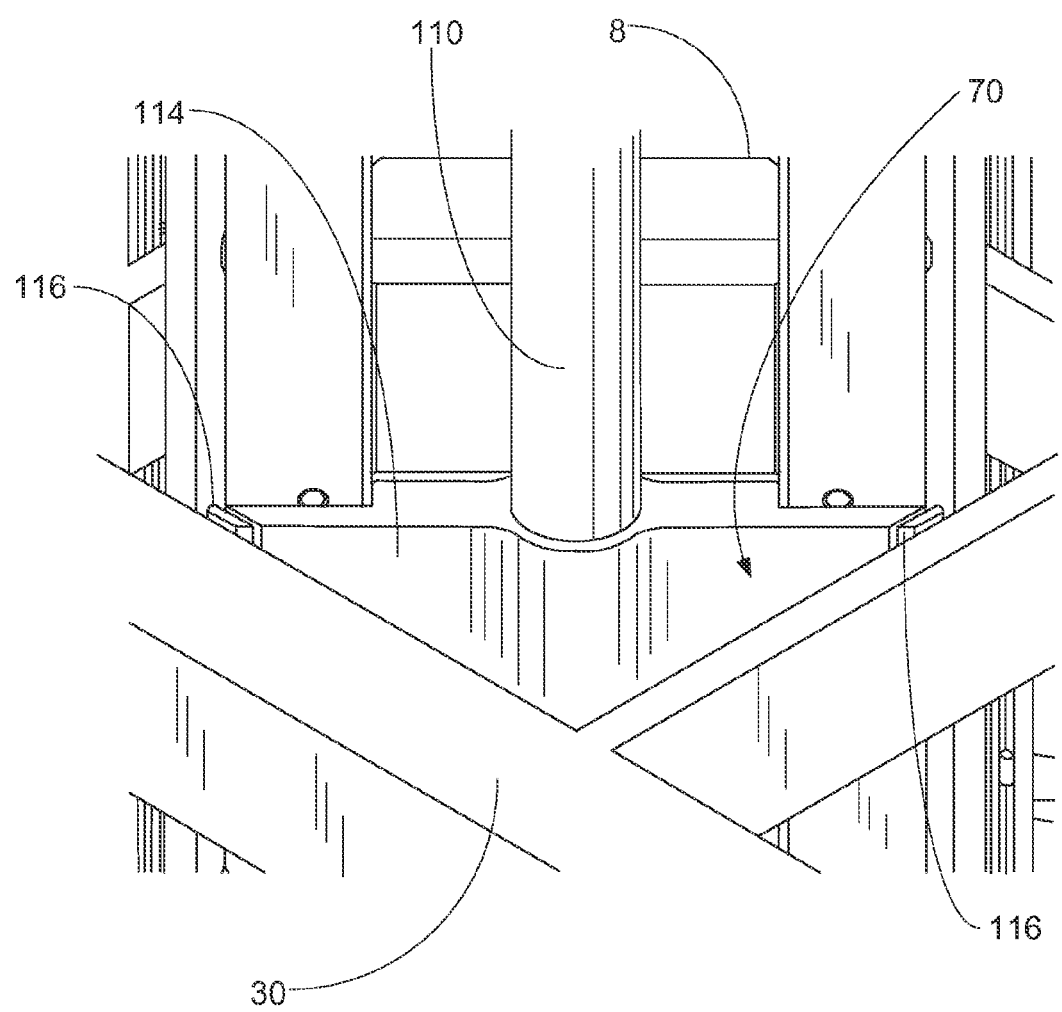
FIG. 22 shows a perspective view of the upper portion of the CRDM of FIG. 21 installed with the compliance features seated in the upper hanger plate.

With reference to FIGS. 21 and 22, an upper end of a CRDM 8 includes a hydraulic line 110 delivering hydraulic power to a scram mechanism. Straps 112, 114 secure the hydraulic line 110 to the CRDM 8. The strap 114 is modified to include compliance features 116. As seen in FIG. 22, the compliance features 116 comprise angled spring blocks that wedges into the opening 70 of the upper hanger plate 30 when the CRDM 8 is fully inserted. It will be appreciated that such compliance features 116 can be incorporated into straps retaining other elements, such as electrical cables (e.g. MI cables). The illustrative compliance features 116 can be constructed as angled leaf springs cut into the (modified) strap 114. Alternatively, such leaf springs can be additional elements welded onto angled ends of the strap 114. By including such springs on straps 114 on opposite sides of the CRDM 8, four contact points are provided to secure the CRDM against lateral motion in any direction. The wedged support provided by the straps 114 also leave substantial room for coolant flow through the opening 70 in the upper hanger plate 30.

The disclosed embodiments are merely illustrative examples, and numerous variants are contemplated. For example, the suspended frame of the upper internals can include more than three plates, e.g. the power distribution plate could be a separate fourth plate. In another variant, the mid-hanger plate 32 could be separated into two separate hanger plates—an upper mid-hanger plate bottom-supporting the CRDMs, and a lower mid-hanger plate from which the guide frames are suspended. In such a case, the two mid-hanger plates would need to be aligned by suitable alignment features to ensure relative alignment between the CRDMs and the guide frames.

The use of at least three hanger plates is advantageous because it provides both top and bottom lateral support for both the CRDMs and the guide frames. However, it is contemplated to employ only two hanger plates if, for example, the bottom support of the CRDMs is sufficient to prevent lateral movement of the CRDMs.

In the illustrative embodiments, the suspended support assembly 24 is suspended from the mid-flange 5 via the riser transition 38. However, other anchor arrangements are contemplated. For example, the suspended support assembly could be suspended directly from the mid-flange, with the riser transition being an insert secured to the gussets. The mid-flange 5 could also be omitted. One way to implement such a variant is to include a ledge in the lower vessel on which a support ring sits, and the suspended support assembly is then suspended from the support ring. With the mid-flange 5 omitted, the upper and lower flanges 5U, 5L of the upper and lower vessel sections can suitably connect directly (i.e., without an intervening mid-flange). Instead of lifting the upper internals out by the mid-flange 5, the upper internals would be lifted out by the support ring.

In the embodiment of FIGS. 2 and 3, the internal RCPs 16' are incorporated into the upper internals and are lifted out with the upper internals. Other configurations are also contemplated—for example, internal RCPs could be mounted in the upper vessel and removed with the upper vessel.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

We claim:

1. An apparatus comprising:
   a pressure vessel comprising an upper vessel section and a lower vessel section;
   a nuclear reactor core comprising fissile material contained in a containing structure and disposed in the lower vessel section; and
   upper internals disposed in the lower vessel section above the nuclear reactor core, the upper internals including at least guide frames and internal control rod drive mechanisms (CRDMs) with CRDM motors mounted on a suspended support assembly that is suspended both in and from the pressure vessel and includes a plurality of hanger plates connected by tie rods, the plurality of hanger plates including an upper hanger plate, a mid-hanger plate, and a lowermost hanger plate having alignment features configured to align the upper internals with the containing structure that contains the nuclear reactor core,
   wherein the internal CRDMs are disposed between the mid-hanger plate and the upper hanger plate.

2. The apparatus of claim 1, wherein the containing structure includes at least one of a core former and a core basket.

3. The apparatus of claim 1, wherein the guide frames are mounted by the lowermost hanger plate and the mid-hanger plate.

4. The apparatus of claim 3, wherein the guide frames hang from the mid-hanger plate and the lowermost hanger plate provides lateral support for the guide frames.

5. The apparatus of claim 3, wherein the guide frames are bottom-supported by the lowermost hanger plate.

6. The apparatus of claim 3, wherein the lowermost hanger plate includes openings in which the bottoms of the guide frames are secured.

7. The apparatus of claim 1, wherein the pressure vessel further includes a mid-flange interposed between the upper and lower vessel sections, and the suspended support assembly of the upper internals is suspended from the mid-flange.

8. A method performed in conjunction with a nuclear reactor including a pressure vessel with upper and lower vessel sections, a nuclear reactor core comprising fissile material contained in a containing structure and disposed in the lower vessel section, and upper internals disposed in the lower vessel section that include at least guide frames and internal control rod drive mechanisms (CRDMs) with CRDM motors mounted on a suspended support assembly that is suspended both in and from the pressure vessel and includes a plurality of hanger plates, the plurality of hanger plates including an upper hanger plate, a mid-hanger plate, and a lower hanger plate connected by tie rods, the method comprising:
   inserting the upper internals into the lower vessel section;
   disposing the internal CRDMs between the upper hanger plate and the mid-hanger plate; and
   during the inserting, aligning the upper internals with the nuclear reactor core by engaging alignment features of a lowermost hanger plate of the suspended support assembly with the containing structure that contains the nuclear reactor core.

9. The method of claim 8 further comprising:
   suspending the guide frames from the mid-hanger plate above the lower hanger plate; and
   laterally supporting bottoms of the guide frames by the lower hanger plate.

10. The method of claim 8 further comprising:
bottom supporting the guide frames by the lower hanger plate.

11. An apparatus comprising:
a pressure vessel comprising an upper vessel section and a lower vessel section;
a nuclear reactor core comprising fissile material contained in a containing structure and disposed in the lower vessel section; and
upper internals disposed in the lower vessel section, the upper internals including at least guide frames and internal control rod drive mechanisms (CRDMs) with CRDM motors mounted on a suspended support assembly that is suspended both in and from the pressure vessel and includes a plurality of hanger plates connected by tie rods, the plurality of hanger plates including an upper hanger plate, a mid-hanger plate and a lowermost hanger plate engaging bottoms of the guide frames,
wherein the internal CRDMs are disposed between the mid-hanger plate and the upper hanger plate.

12. The apparatus of claim 11, wherein the guide frames are mounted between the lowermost hanger plate and the mid-hanger plate.

13. The apparatus of claim 12, wherein the guide frames hang from the mid-hanger plate and the lowermost hanger plate provides lateral support for the guide frames.

14. The apparatus of claim 11, wherein the guide frames are bottom-supported by the lowermost hanger plate.

15. The apparatus of claim 11, wherein the lowermost hanger plate includes openings in which the bottoms of the guide frames are secured.

* * * * *

UNITED STATES PATENT AND TRADEMARK OFFICE
CERTIFICATE OF CORRECTION

PATENT NO. : 9,754,688 B2  
APPLICATION NO. : 13/861480  
DATED : September 5, 2017  
INVENTOR(S) : Matthew W. Ales et al.

Page 1 of 1

It is certified that error appears in the above-identified patent and that said Letters Patent is hereby corrected as shown below:

On the Title Page

Item (73), Assignee, please change "BWX Technologies, Inc." to --BWXT mPower, Inc--.

In the Specification

In Column 4, Line 47, please delete "of the of the" and insert --of the--.

Signed and Sealed this  
Twenty-fifth Day of February, 2020

Andrei Iancu  
*Director of the United States Patent and Trademark Office*